(12) United States Patent
Nakagawa

(10) Patent No.: US 8,271,826 B2
(45) Date of Patent: Sep. 18, 2012

(54) DATA RECEIVER APPARATUS AND DATA TRANSMITTER APPARATUS

(75) Inventor: Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1033 days.

(21) Appl. No.: 12/230,115

(22) Filed: Aug. 22, 2008

(65) Prior Publication Data

US 2009/0060084 A1    Mar. 5, 2009

Related U.S. Application Data

(63) Continuation of application No. PCT/JP2006/303498, filed on Feb. 24, 2006.

(51) Int. Cl.
*G06F 1/00* (2006.01)
*G06F 1/04* (2006.01)
*G06F 13/00* (2006.01)
*G06F 9/26* (2006.01)

(52) U.S. Cl. .................. 713/502; 711/100; 711/200

(58) Field of Classification Search .............. 713/500, 713/502; 711/100, 200
See application file for complete search history.

(56) References Cited

U.S. PATENT DOCUMENTS

| | | | |
|---|---|---|---|
| 5,642,318 A * | 6/1997 | Knaack et al. ............... 365/201 | |
| 5,987,540 A | 11/1999 | Hashiguchi | |
| 7,092,774 B1 * | 8/2006 | Gifford et al. ............... 700/94 |
| 7,093,061 B2 * | 8/2006 | Teo ............................. 711/101 |
| 2003/0079036 A1 * | 4/2003 | Terada et al. ................ 709/231 |
| 2005/0163276 A1 * | 7/2005 | Sudo et al. .................. 375/372 |
| 2005/0281365 A1 | 12/2005 | Yamada |
| 2006/0002399 A1 | 1/2006 | Muta |
| 2006/0023825 A1 | 2/2006 | Kato et al. |

FOREIGN PATENT DOCUMENTS

| JP | 10-232853 | 9/1998 |
|---|---|---|
| JP | 2004-80688 | 3/2004 |
| JP | 2006-5665 | 1/2006 |
| JP | 2006-19790 | 1/2006 |
| JP | 2006-50102 | 2/2006 |
| WO | 2004/031926 A1 | 4/2004 |

OTHER PUBLICATIONS

International Search Report mailed May 30, 2006 in connection with International Application No. PCT/JP2006/303498.

* cited by examiner

*Primary Examiner* — Ji H Bae
(74) *Attorney, Agent, or Firm* — Staas & Halsey LLP

(57) ABSTRACT

Write pointer generation units successively switch and indicate storage locations of data transmitted from a transmitter end LSI from plural buffers constituting FIFO circuits. A clock-step ring buffer delays a gated step signal to instruct an operation stop. When receiving the gated stop signal delayed by the clock-step ring buffer, the write pointer generation units stop switching instructions of the storage locations.

12 Claims, 23 Drawing Sheets

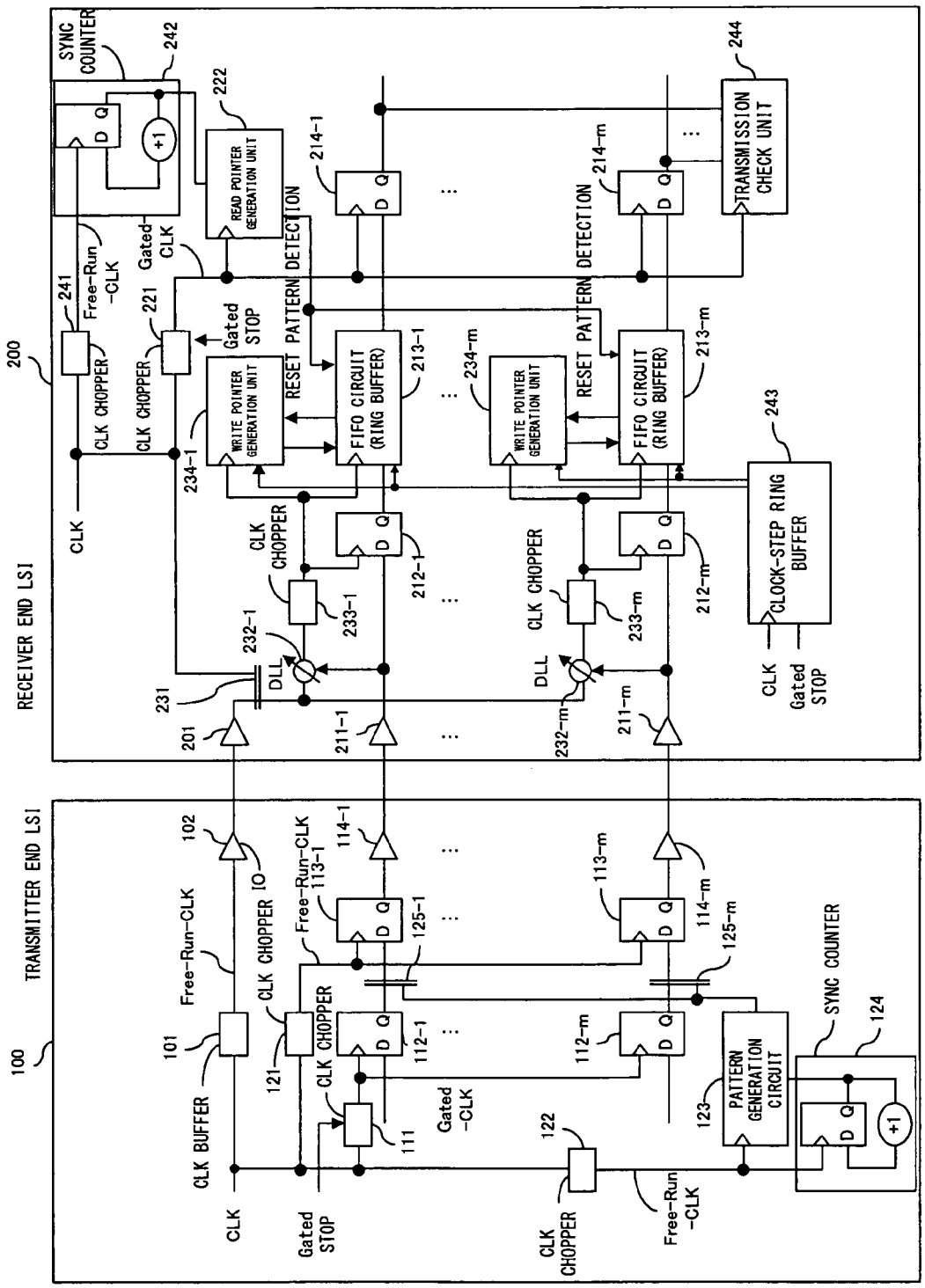
F I G. 4

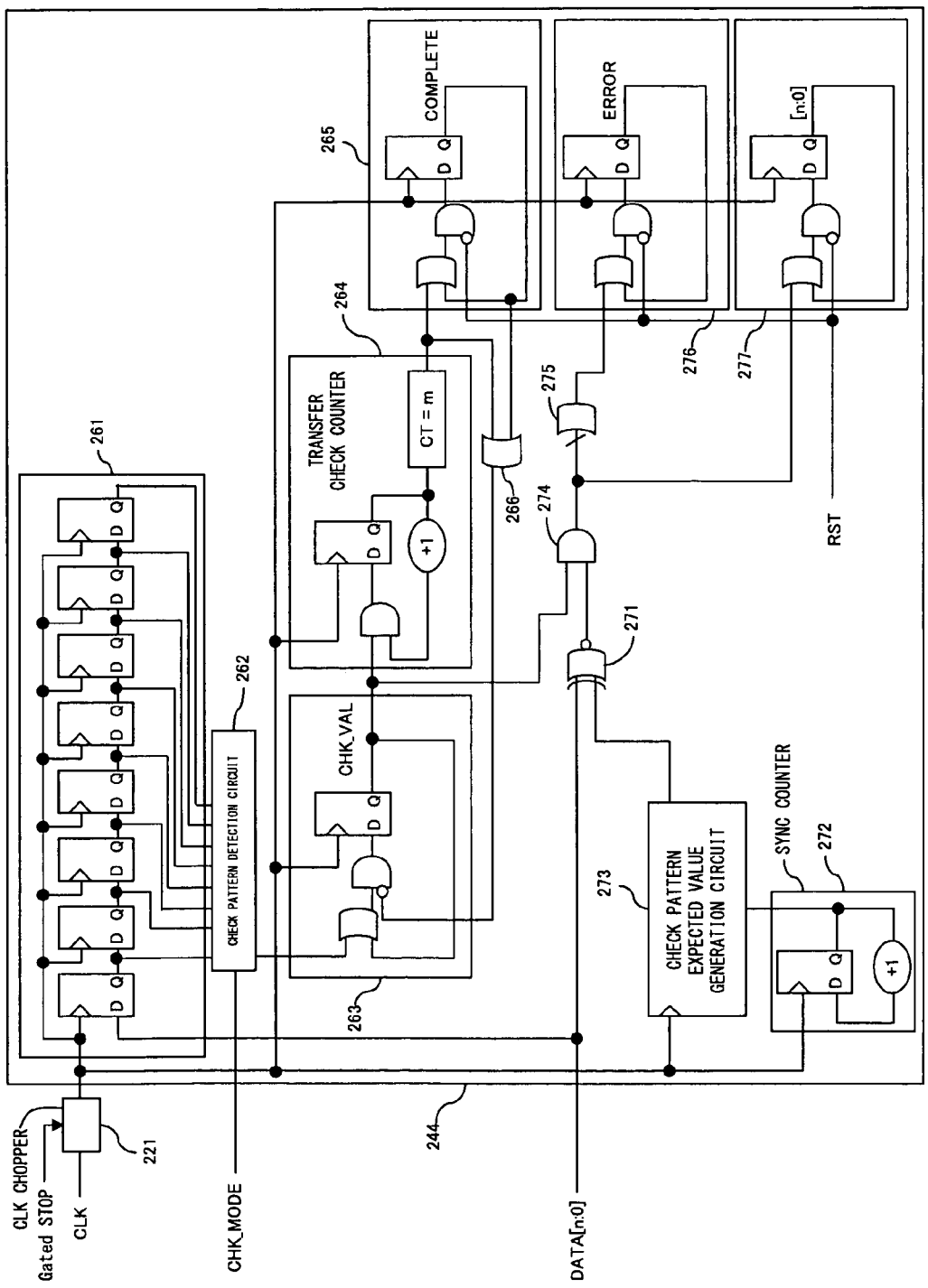
F I G. 7

DATA RECEIVER APPARATUS AND DATA TRANSMITTER APPARATUS

CROSS REFERENCE TO RELATED APPLICATION

This application is a continuation application of international PCT application No. PCT/JP2006/303498 filed on Feb. 24, 2006.

BACKGROUND OF THE INVENTION

1. Field of the Invention

The present invention relates to a data transmission technique, and particularly to a technique for transmitting data at high speed.

2. Description of the Related Art

Conventional high-speed inter-LSI data transmission systems include source synchronous signaling. In the source synchronous signaling, a transmitter end LSI sends data and clock at the same time, and a receiver end LSI delays the phase of a received clock in accordance with the received data and uses the delayed phase for transmitted data reading.

A clock-step execution function is debug means of an LSI system consisting of plural LSIs that are operated at a single reference clock. The clock-step execution function to check state transition of each unit while running the clock cycle one by one, and the function enables a detailed search of system operations. In order to support the clock-step execution function, a mechanism to prevent data loss during the data transmission between LSIs is required.

An example of the data transmission system employing the source synchronous clocking is shown in FIG. 1.

In FIG. 1, an internal clock (CLK) of a transmitter end LSI 100 is transmitted through a clock buffer 101 and to a receiver end LSI 200 by an IO buffer 102.

Meanwhile, the internal clock of the transmitter end LSI 100 is also input to a clock chopper 111. The clock chopper 111 normally outputs an H-level (high level) signal but outputs a chopper signal (an L-level (low level) short time signal) when one edge (e.g. falling edge) of the internal clock is detected. The output signal of the clock chopper 111 is input to each of clock terminals that are D-latches 112-1, . . . , 112-*m*, 113-1, . . . , 113-*m*.

Transmission data that is m-bit parallel data is input bit by bit basis to the D-latches 112-1, . . . , 112-*m*. The outputs of the D-latches 112-1, . . . , 112-*m* are input to the D-latches 113-1, . . . , 113-*m*, respectively. Consequently, transmission data with internal clock that is one cycle before the internal clock in the D-latches 112-1, . . . , 112-*m* is latched in the D-latch 113-1, . . . , 113-*m*. The transmission data output from the D-latch 113-1, . . . , 113-*m* is transmitted to the received end LSI 200 by IO buffers 114-1, . . . , 114-*m*.

It should be noted that a gated stop signal is input to the clock buffer 101 and the clock chopper 111. The clock buffer 101 stops outputting a clock when the gated stop signal is changed to the H-level signal. The clock chopper 111 stops the chopper signal and continues to output the H-level signal when the gated stop signal is changed to the H-level signal.

In the receiver end LSI 200, the transmission clock transmitted from the IO buffer 102 of the transmitter end LSI 100 is received by an IO buffer 201, and is transmitted to a phase adjuster unit 202. The phase adjuster unit 202 delays the transmission clock. The amount of delay at that time is determined in consideration of wiring between the transmitter end LSI 100 and the receiver end LSI 200, wiring in the LSI, and an amount of delay due to variation in process of the LSI. The transmission clock output from the phase adjuster unit 202 is input to the clock chopper 203.

Meanwhile, the transmission data transmitted from the IO buffers 114-1, . . . , 114-*m* of the transmitter end LSI 100 is received by the IO buffers 211-1, . . . , 211-*m* of the receiver end LSI 200 and is input to D-latches 212-1, . . . , 212-*m*. The D-latches 212-1, . . . , 212-*m* output the transmission data when a chopper signal is input to each clock terminal from a clock chopper 203.

The transmission data output from the D-latches 212-1, . . . , 212-*m* is transmitted to FIFO circuits 213-1, . . . , 213-*m*. The FIFO circuits 213-1, . . . , 213-*m* form a ring buffer with generation of pointers in a write pointer generation unit 204 and a read pointer generation unit 222. The ring buffer is used for switching the clock of the transmission data from the transmission clock (i.e. the internal clock of the transmitter end LSU 100) to the internal clock of the receiver end LSI 200.

The write pointer generation unit 204 generates a write pointer indicating any one of plural buffers of the FIFO circuits 213-1, . . . , 213-*m*, and switches the write pointer so that the other buffers are indicated successively based on the chopper signal from the clock chopper 203. On the other hand, the read pointer generation unit 222 generates a read pointer indicating any one of plural buffers of the FIFPO circuits 213-1, . . . , 213-*m*, and switches the read pointer so that the other buffers are indicated successively based on the chopper signal from the clock chopper 221. Note that the internal clock of the receiver end LSI 200 is input to the clock chopper 221.

Of the plural buffers of the FIFO circuits 213-1, . . . , 213-*m*, the transmission data output from the D-latches 212-1, . . . , 212-*m* is written in the one indicated by the write pointer generated by the write pointer generation unit 204, and is read out from the one indicated by the read pointer generated by the read pointer generation unit 222. In such a manner, the clock of the transmission data is made the switch from the internal clock of the transmitter end LSI 100 to the internal clock of the receiver end LSI 200.

The transmission data output from the FIFO circuits 213-1, . . . , 213-*m* is, after being latched once in the D-latches 214-1, . . . , 214-*m*, transmitted into the received end LSI 200 in accordance with the chopper signal from the clock chopper 221.

It should be noted that the clock chopper 221 in the receiver end LSI 200 has an input of a gated stop signal that is the same as the one in the transmitter end LSI 100. The clock chopper 221 stops the chopper signal and continues to output the H-level signal when the gated stop signal is changed to the H-level signal.

Operations of a case that the clock-step execution function is executed in the circuit shown in FIG. 1 are explained.

The transmission data transmitted from the transmitter end LSI 100 is retrieved by the D-latches 212-1, . . . , 212-*m* in the initial stage of the receiver end LSI 200 at the transmitter end internal clock that has the same cycle as the one in the D-latches 113-1, . . . , 113-*m* in the last stage of the transmitter end LSI 100. Consequently, even if the gated stop signal is changed to the H-level signal and the transmission clock is stopped, all of the transmission data transmitted from the transmitter end LSI 100 can be received by the receiver end LSI 200. Because the transmission clock transmitted from the transmitter end LSI 100 stops at the completion of the transmission data reception in the receiver end LSI 200, overwriting of the transmission data would not occur in the ring buffer (FIFO circuits 213-1, . . . , 213-*m*) afterward.

FIG. 2 shows an example of a time diagram of each unit in the transmission system shown in FIG. 1.

The correspondence relationship between each chart of FIG. 2 and FIG. 1 is indicated by numbers in parenthesis. Note that a chart (0) in FIG. 2 is not shown in FIG. 1. This chart indicates an output waveform of the clock chopper 111 of the transmitter end LSI 100 when the gated stop signal is ignored. A chart (11) in FIG. 2 indicates data storage state in each of the plural (in this case 16) buffers in the ring buffer 213-1.

In FIG. 2, a solid line arrow indicates that the chopper signal from the clock chopper 203 stops (see chart (8)) with a delay from stop of the transmission clock (see chart (5)) by the gated stop signal (see chart (2)). In this case, 2.5 cycle delay is generated between the stop time of the transmission clock in the chart (5) and the stop time of the transmission clock in the chart (6). This is the amount of delay generated in the clock transmission from the transmitter end LSI 100 to the receiver end LSI 200 in the example of the charts. 0.5 cycle delay is generated between transmission clock shown in the chart (6) and the chopper signal from the clock chopper 203 shown in the chart (8). This is an amount of adjustment delay in the phase adjuster unit 202 of the example of the charts.

A broken line arrow shown in FIG. 2 is discussed. The D-latch 113-1 in the last stage of the transmitter end LSI 100 stops at a state in which data "DT7" is output as shown in the chart (4) by means of the gated stop signal shown in the chart (2). The data "DT7" is delayed in the data transmission from the transmitter end LSI 100 to the receiver end LSI 200. However, the original data "DT7" can be received as shown in the chart (9) because the D-latch 212-1 in the initial stage of the receiver end LSI 200 is operated in accordance with the transmission clock transmitted from the transmitter end LSI 100 in the configuration of FIG. 1. In this configuration, additionally, switching of the write pointer by the write pointer generation unit 204 is also operated in accordance with the transmission clock transmitted from the transmitter end LSI 100. As a result, the data "DT7" output from the D-latch 212-1 can be stored in a proper buffer of the FIFO circuit 213-1 as shown in the chart (11).

In the source synchronous clocking described above, each bit data is latched at the same transmission clock when the parallel data is received. For that reason, as shown in FIG. 3A, in order to secure set-up time and hold time for every bit, variation in the amount of delay among bits in the data transmission has to be sufficiently smaller than the cycle of the transmission clock. If the variation in the amount of delay is larger than the cycle of the transmission clock, bits in which the set-up time and hold time cannot be secured may be generated as shown in FIG. 3B. In other words, the source synchronous signaling has limitations in high throughput data transmission.

In order to overcome the above problem, a data synchronous transmission system for adjusting the phase of the transmission clock at data edge for each bit is proposed as a system in which set-up time and hold time can be secured even if the delay variation in bits exceeds the cycle of the transmission clock. Note that the system adjust the phase at the data edge, the receiver end clock can be used instead of the transmitter end clock.

In relation to the technologies explained above, Japanese Patent Application Publication No. 2006-5665, for example, discloses a technology for improving the gap between a received data signal and a received clock signal that is delayed by adjusting the amount of delay of the received clock signal based on the detection result of the relationship between phases of the two signals.

As another example, Japanese Patent Application Publication No. 2006-19790 discloses a technology for absorbing a phase difference generated between bits at the time of high-speed transmission of parallel data by a ring buffer.

In addition, International Publication No. WO2004/031926, for example of a technology relating to the present invention, discloses a technology of the use of high frequency clock generated from a reference clock in each device so as to realize serial transmission of data between devices using different frequency clocks.

Japanese Patent Application Publication No. 2006-50102, for the other example, discloses a technology to control variation in transmission of each bit at the time of high-speed transmission of parallel data by the use of a reference signal shared by a transmitter device and a receiver device and a training pattern transmitted from the transmitter device to the receiver device.

In the above data synchronous signaling, the transmission clock used for latching the data in the initial stage at the receiver end can be more than 1 cycle off. For that reason, there is no assurance that the transmission clock is the same as the clock transmitted with the data from the transmitter end. In addition, because the phase of the clock used for latching the data of each bit is separately adjusted with respect to each bit of the parallel data, there is no assurance that the phase of each clock is the same as each other after the phase adjustment. For that reason, the way to correctly read the latched parallel data becomes a problem that has to be solved.

If the clock is stopped by application of the clock-step execution function, some bits of the parallel data can be received while other bits cannot be received due to the variation in transmission of bits, and as a result, there is no assurance that the data being transmitted can be received correctly.

Furthermore, even if an equalizer that stabilizes the waveform of the transmission clock during high-speed transmission is provided in the transmission path, because the waveform of the clocks at the start and at the stop cannot be assured by the equalizer, data transmission reliability cannot be assured when the clock-step execution function is executed.

SUMMARY OF THE INVENTION

A data receiver apparatus that is one aspect of the present invention comprises a storage location indication unit for successively switching and indicating a storage location storing data transmitted from a transmitting source, and a delay unit for delaying a stop signal instructing to stop an operation, and the storage location indication unit stops switching the indication of the storage location when receiving the stop signal delayed by the delay unit.

It should be noted that the data reception method performed in the data receiver apparatus described above is also related to the present invention.

The data transmitter apparatus that is another aspect of the present invention comprises a stop unit for stopping an output of data to be transmitted to a data transmission path when receiving a stop signal instructing to stop an operation, and a switching unit for outputting specific pattern data instead of the data to be transmitted to the data transmission path when receiving the stop signal.

BRIEF DESCRIPTION OF THE DRAWINGS

The present invention will be more apparent from the following detailed description when the accompanying drawings are referenced.

FIG. 4 is a diagram showing a configuration of the data transmission system implementing the present invention;

FIG. 7 is a diagram illustrating details of the configuration of the transmission check unit in FIG. 4;

DESCRIPTION OF THE PREFERRED EMBODIMENTS

In the following description, the embodiments of the present invention are explained with reference to the drawings.

Figure 1:
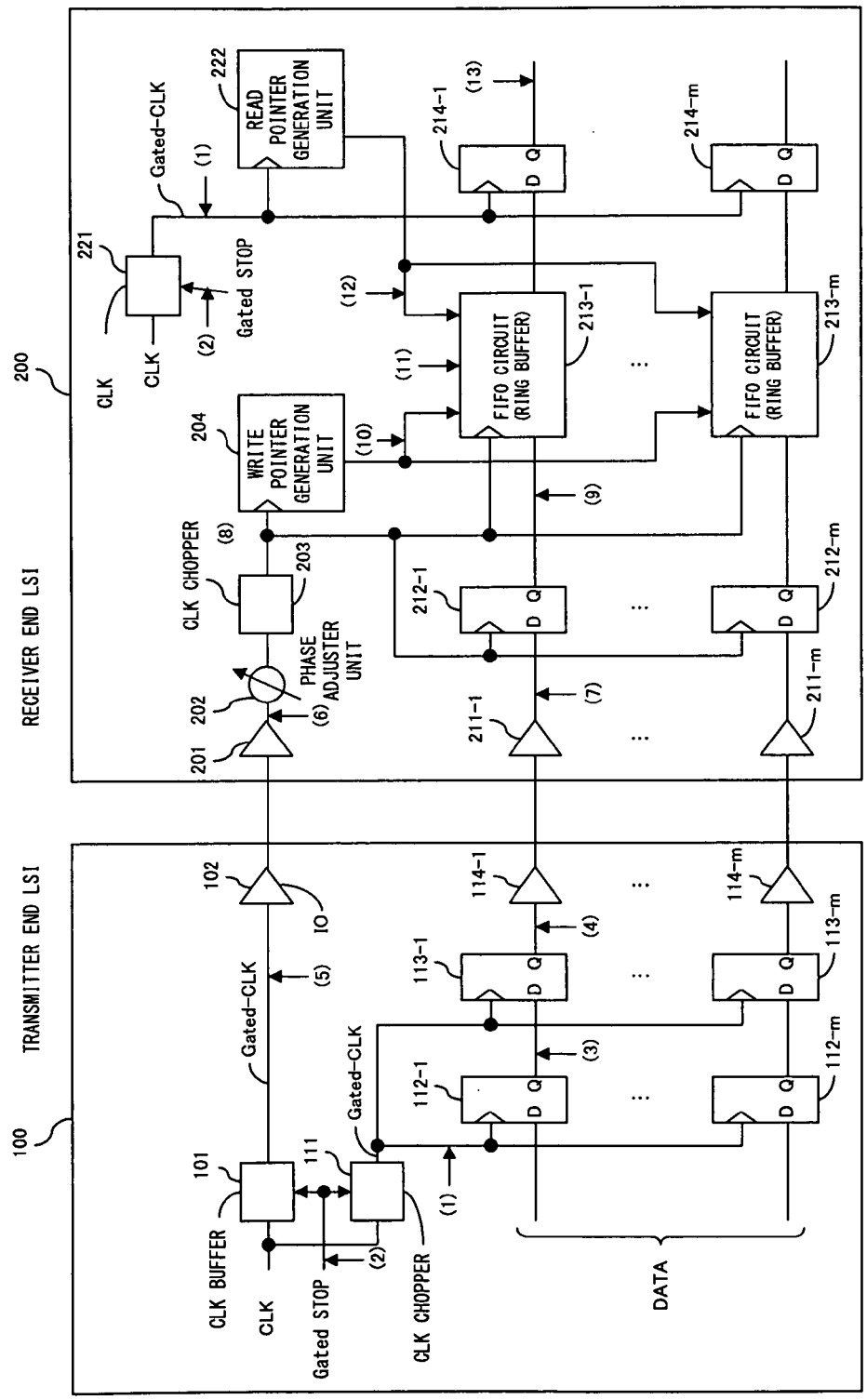
FIG. 1 is a diagram illustrating an example of a configuration of a data transmission system employing a source synchronous signaling.
Figure 2:
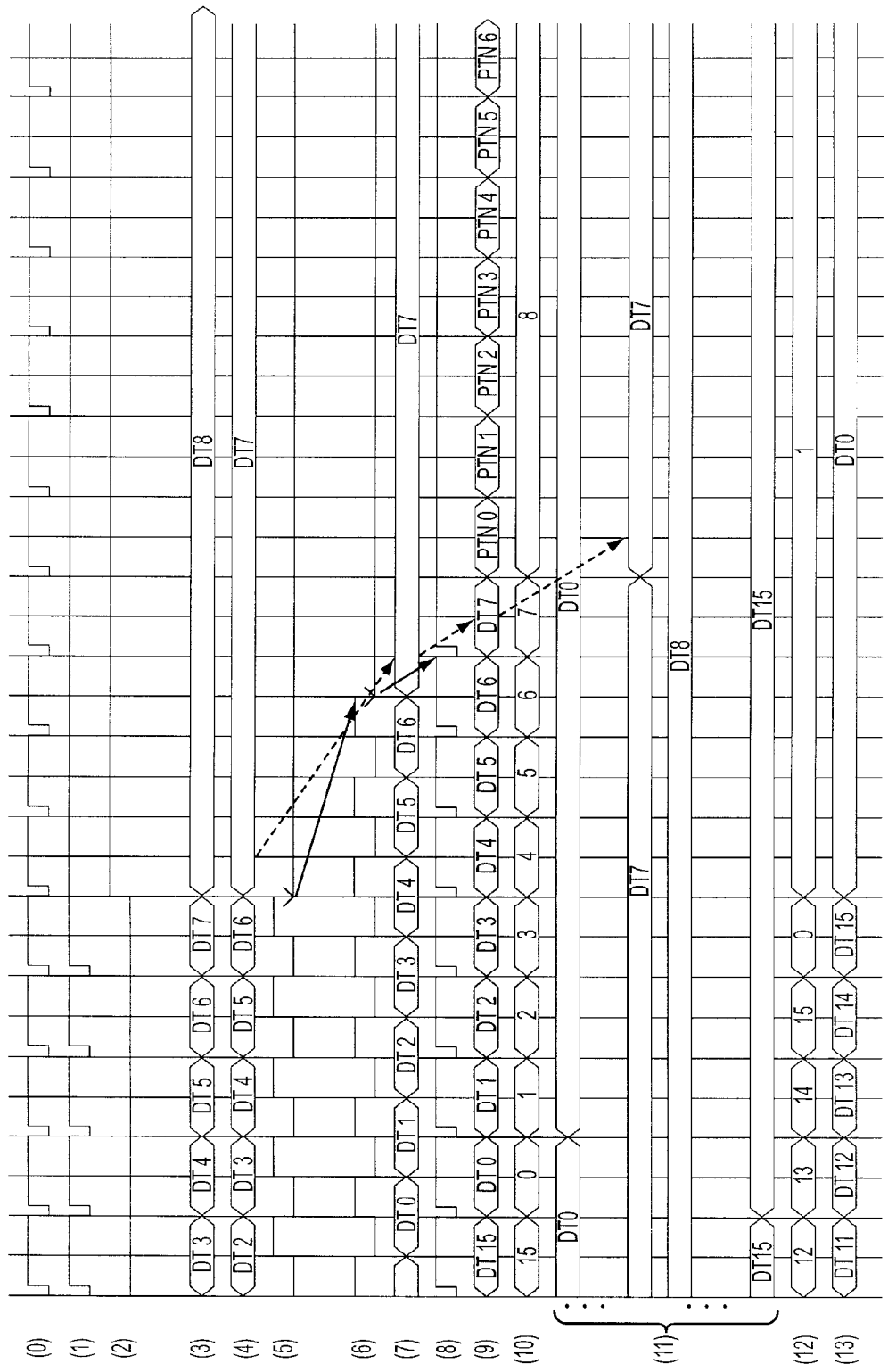
FIG. 2 is a diagram showing an example of a time chart of each unit in the transmission system shown in FIG. 1.
Figure 3A:
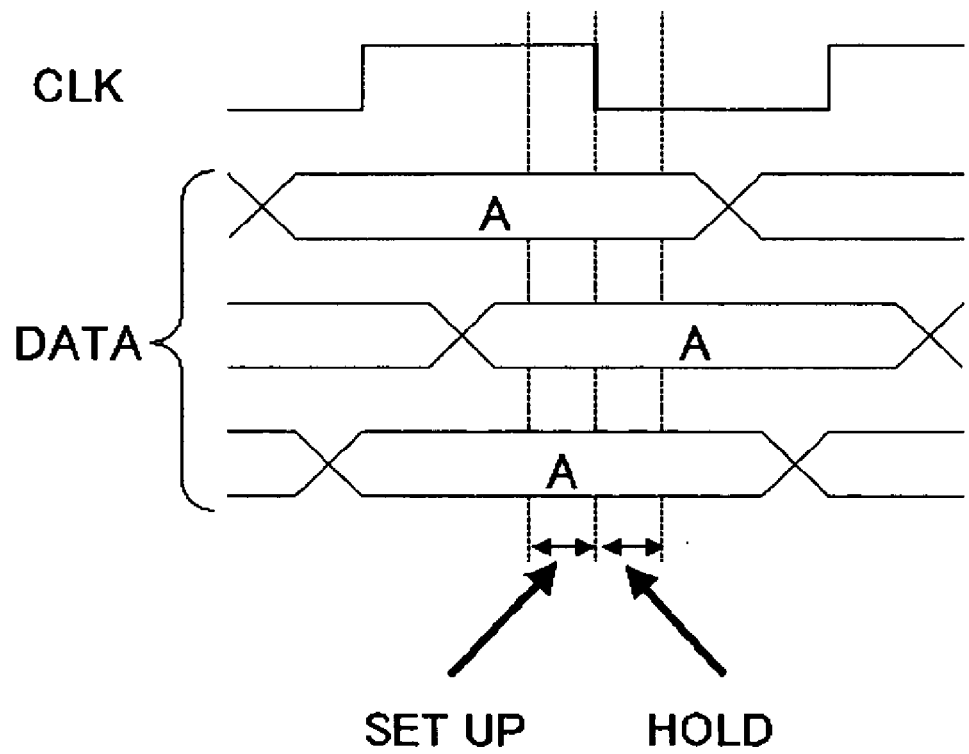
FIG. 3A is a diagram illustrating a case in which differences in the amount of delay among bits in the data transmission can be allowed.
Figure 3B:
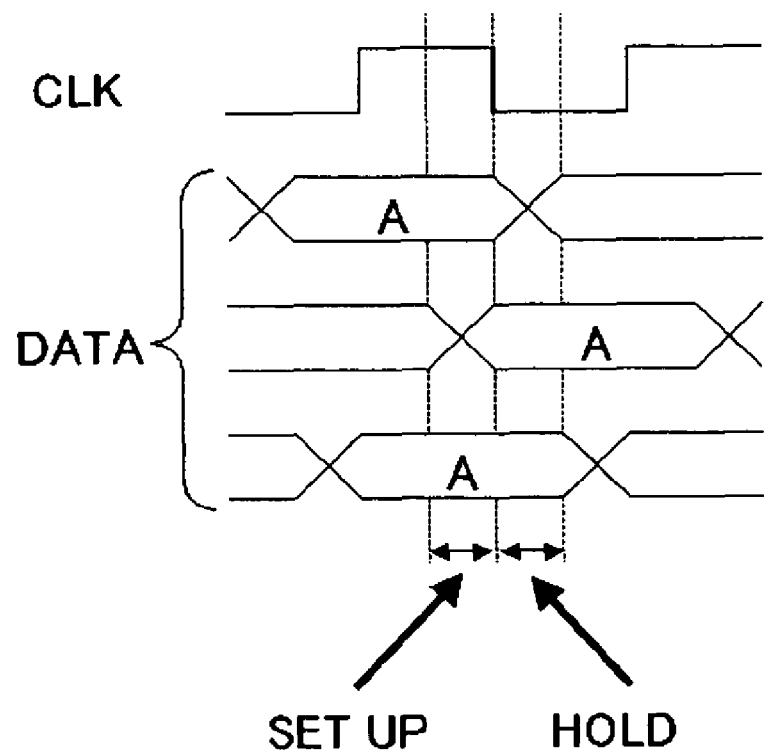
FIG. 3B is a diagram illustrating a case in which differences in the amount of delay among bits in the data transmission cannot be allowed.

The explanation of FIG. 4 is provided first. FIG. 4 shows a configuration of a data transmission system in which the present invention is implemented. Note that in FIG. 4, components that are the same as those in FIG. 1 are assigned with the same numerical references as in FIG. 1.

In FIG. 4, an internal clock (CLK) of a transmitter end LSI 100 is transmitted via a clock buffer 101 and to a receiver end LSI 200 by an IO buffer 102.

Meanwhile, the internal clock of the transmitter end LSI 100 is also input to clock choppers 111, 121, and 122. The output signal of the clock chopper 111 is input to each of clock terminals of D-latches 112-1, ..., 112-$m$, and the output signal of the clock chopper 121 is input to each of the clock terminals of 113-1, ..., 113-$m$. The output signal of the clock chopper 122 is input to each of the clock terminals of a pattern generation circuit 123 and a synchronous (SYNC) counter 124.

To the D-latches 112-1, ..., 112-$m$, transmission data that is m-bit parallel data is input for each bit. Each output of the D-latches 112-1, ..., 112-$m$ is input to the D-latches 113-1, ..., 113-$m$ via selectors 125-1, ..., 125-$m$. Accordingly, if the selectors 125-1, ..., 125-$m$ select the output of the D-latches 112-1, ..., 112-$m$, the transmission data that is 1 cycle of the internal clock earlier than the D-latches 112-1, ..., 112-$m$ is latched in the D-latches 113-1, ..., 113-$m$. The transmission data output from the D-latches 113-1, ..., 113-$m$ is transmitted to the receiver end LSI 200 by the IO buffers 114-1, ..., 114-$m$.

Note that a gated stop signal is input to the clock chopper 111. The gated stop signal is a signal instructing the stop of the operations of the entire system shown in FIG. 4.

The clock chopper 111 stops a chopper signal and continues to output an H-level signal if the gated stop signal is an H-level signal. Unlike the configuration in FIG. 1, however, the dated stop signal is not input to the clock buffer 101 in the configuration of FIG. 4. Consequently, the clock buffer 101 continues to transmit the internal clock of the transmitter end LSI 100 to the receiver end LSI 200 via the IO buffer 102 independently of the gated stop signal. In the configuration of FIG. 4, the gated stop signal is not also input to the clock chopper 121. Consequently, the D-latches 113-1, ..., 113-$m$ continue to transmit the transmission data to the receiver end LSI 200 via the IO buffers 114-1, ..., 114-$m$ independently of the gated stop signal. Because the gated stop signal is not input to the clock chopper 122, the gated stop signal has no influence on the operations of the synchronous (SYNC) counter 124.

The pattern generation circuit 123 generates a several types of pattern data that are bit sequences of predetermined patterns, synchronizes the pattern data with the chopper signal transmitted from the clock chopper 122, and outputs the synchronized data. The output of the pattern generation circuit 123 is input to the D-latches 113-1, ..., 113-$m$ via the selectors 125-1, ..., 125-$m$. Accordingly, if the selectors 125-1, ..., 125-$m$ select the output of the pattern generation circuit 123, the pattern data that is output from the pattern generation circuit 123 is latched in the D-latches 113-1, ..., 113-$m$. Details of the pattern data are explained later.

The synchronous (SYNC) counter 124 is an increment counter that counts the chopper signal output from the clock chopper 122. The synchronous counter 124 is operative in synchronization with the cycle of the synchronous counter 242 of the receiver end LSI 200. This synchronization operation is realized by using a reference signal shared by the transmitter end LSI 100 and the receiver end LSI 200. Note that the reference signal is generated outside.

The pattern generation circuit 123 starts the output of the pattern data at the timing when the synchronous counter 124 counts a certain count value.

In the receiver end LSI 200, the transmission clock transmitted from the IO buffer 102 of the transmitter end LSI 100 is received by the IO buffer 102 and is sent to DLL 232-1, ..., 232-*m* via a selector 231. Accordingly, if the selector 231 selects the output of the IO buffer 201, the transmission clock is input to the DLL 232-1, ..., 232-*m*. Note that the internal clock of the receiver end LSI 200 can be input to the DLL 232-1, ..., 232-*m* by switching the selector 231.

Meanwhile, the transmission data transmitted from the IO buffers 114-1, ..., 114-*m* of the transmitter end LSI 100 is received by the IO buffers 211-1, ..., 211-*m* and is input to the D-latches 212-1, ..., 212-*m*, while being sent to DLL 232-1, ..., 232-*m*.

DLL (Delay Locked Loop) 232-1, ..., 232-*m* is provided to delay the transmission clock transmitted from the IO buffer 102, and additionally DLL 232-1, ..., 232-*m* adjusts and improves the phase difference between the transmission data and the transmission clock by controlling the amount of delay at the time in accordance with the detection result of the phase relation between the transmission data transmitted from the IO buffers 211-1, ..., 211-*m* and the delayed transmission clock. The transmission clock output from the DLL 232-1, ..., 232-*m* is input to the clock chopper 233-1, ..., 233-*m*.

The D-latches 212-1, ..., 212-*m* output the transmission data when the chopper signal is input to each of the clock terminals from the clock choppers 233-1, ..., 233-*m*.

The transmission data output from the D-latches 212-1, ..., 212-*m* is transmitted to the FIFO circuits 213-1, ..., 213-*m*. The FIFO circuits 213-1, ..., 213-*m* serves as a ring buffer with pointer generation in the write pointer generation units 234-1, ..., 234-*m* and the read pointer generation unit 222. The ring buffer is used for making the transmission data switch from the transmission clock in which the phase is adjusted for each parallel bit of the transmission data by the DLL 232-1, ..., 232-*m* to the internal clock of the receiver end LSI 200. This ring buffer is hereinafter referred to as "data ring buffer".

The write pointer generation units 234-1, ..., 234-*m* generates write pointers that point to any of the plural buffers in the FIFO circuits 213-1, ..., 213-*m*, and the write pointers are switched so as to point to another buffers successively in accordance with the timing of the chopper signals from the clock choppers 233-1, ..., 233-*m*. Meanwhile, the read pointer generation units 204 generates read pointers that point to any of the plural buffers in the FIFO circuits 213-1, ..., 213-*m*, and the read pointers are switched so as to point to another buffer successively in accordance with the timing of the chopper signal output from the clock chopper 221. The order of the switching at that time is the same as the order of switching of the write pointer generation units 234-1, ..., 234-*m*.

It should be noted that the internal clock of the receiver end LSI 200 is input to the clock chopper 221. The transmission data output from the D-latches 212-1, ..., 212-*m* is stored in one of the plural buffers in the FIFO circuits 213-1, ..., 213-*m*, which is indicated by the write pointer generated in the write pointer generation units 234-1, ..., 234-*m*, and is read by one of the buffers that is indicated by the read pointers generated by the read pointer generation unit 222. As a result, the transmission data is made the switch from the internal clock of the transmitter end LSI 100 to the internal clock of the receiver end LSI 200.

It should be noted that the FIFO circuits 213-1, ..., 213-*m* has a circuit for detecting reception of a reset pattern that is one of the pattern data generated in the pattern generation unit 123 of the transmitter end LSI 100 and transmitted to the receiver end LSI 200. The write pointer generation units 234-1, ..., 234-*m* initializes (resets) the write pointers to be generated when the reception of the reset pattern in the FIFO circuits 213-1, ..., 213-*m* is detected.

The transmission data output from the FIFO circuits 213-1, ..., 213-*m* is, first, latched in the D-latches 214-1, ..., 214-*m*, and then transmitted into the receiver end LSI 200 in accordance with the latch signal output from the clock chopper 221.

It should be noted that the clock chopper 221 in the receiver end LSI 200 receives an input of a gated stop signal that is the same as the gated stop signal in the transmitter end LSI 100. The clock chopper 221 stops the chopper signal and continues to output the H-level signal when the gated stop signal is changed to the H-level signal.

The receiver end LSI 200 in addition, comprises a clock chopper 241, asynchronous (SYNC) counter 242, a clock-step ring buffer 243, and a transmission check unit 244.

The internal clock of the receiver end LSI 200 is input to the clock chopper 241.

The synchronous (SYNC) counter 242 is an increment counter for counting the chopper signal output from the clock chopper 231. As explained above, the synchronous counter 242 synchronizes the cycle with the cycle of the synchronous counter 124 of the transmitter end LSI 100. The read pointer generation unit 222 initializes (resets) the read pointers to be generated when the count of the synchronous counter 242 becomes a certain count value.

The clock-step ring buffer 243 is for delaying the gated stop signal so that the amount of delay corresponds to the amount of delay generated in the data transmission from the transmitter end LSI 100 to the receiver end LSI 200. The gated stop signal delayed in the clock-step ring buffer 243 is transmitted to the write pointer generation unit 234-1, ..., 234-*m* and the FIFO circuits 213-1, ..., 213-*m*, and switching of the write pointer and writing of the transmission data in each buffer in the FIFO circuits 213-1, ..., 213-*m* are stopped in response to the gated stop signal.

The transmission check unit 244 tests the check pattern reception result that is one of the pattern data generated in the pattern generation unit 123 of the transmitter end LSI 100 and transmitted to the receiver end LSI 200, and determines the validity of the received check pattern.

In the above description, the configuration of the system shown in FIG. 4 is explained.

Figure 5:
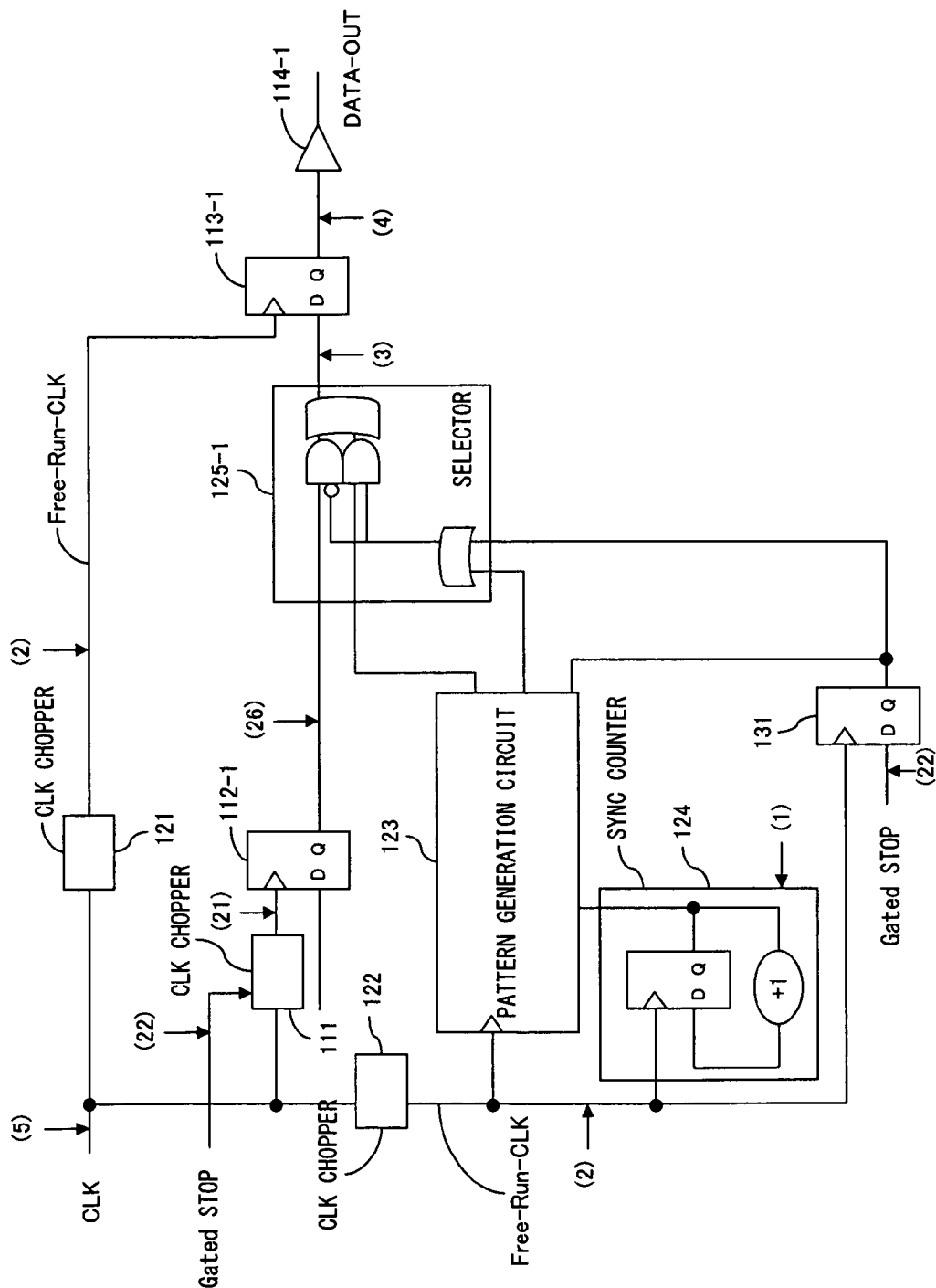
FIG. 5 is a diagram illustrating details of the configuration of the transmitter end LSI in FIG. 4.

FIG. 5 is explained next. FIG. 5 shows details of the configuration of the transmitter end LSI 100 in FIG. 4. Among the components shown in FIG. 4, because every D-latches 112-1, ..., 112-*m*, have the same configuration, as do the selectors 125-1, ..., 125-*m*, D-latches 113-1, ..., 113-*m* and the IO buffers 114-1, ..., 114-*m*, FIG. 5 only shows the D-latch 112-1, the selector 125-1, the D-latch 113-1, and the IO buffer 114-1 for simplicity. In the following description, the explanation is provided in accordance with the configuration shown in FIG. 5.

In the configuration shown in FIG. 5, the D-latch 131 receives an input of the gated stop signal, and the clock terminal of the D-latch 131 receives an input of the chopper signal transmitted from the clock chopper 122. The output of the D-latch 131 is transmitted to the pattern generation circuit 123 and the selector 125-1. Accordingly, pattern data generation by the pattern generation circuit 123 and data transmission from the selector 125-1 to the D-latch 113-1 can be stopped in response to the gated stop signal. The use of the D-latch 131 is explained later.

Figure 6:
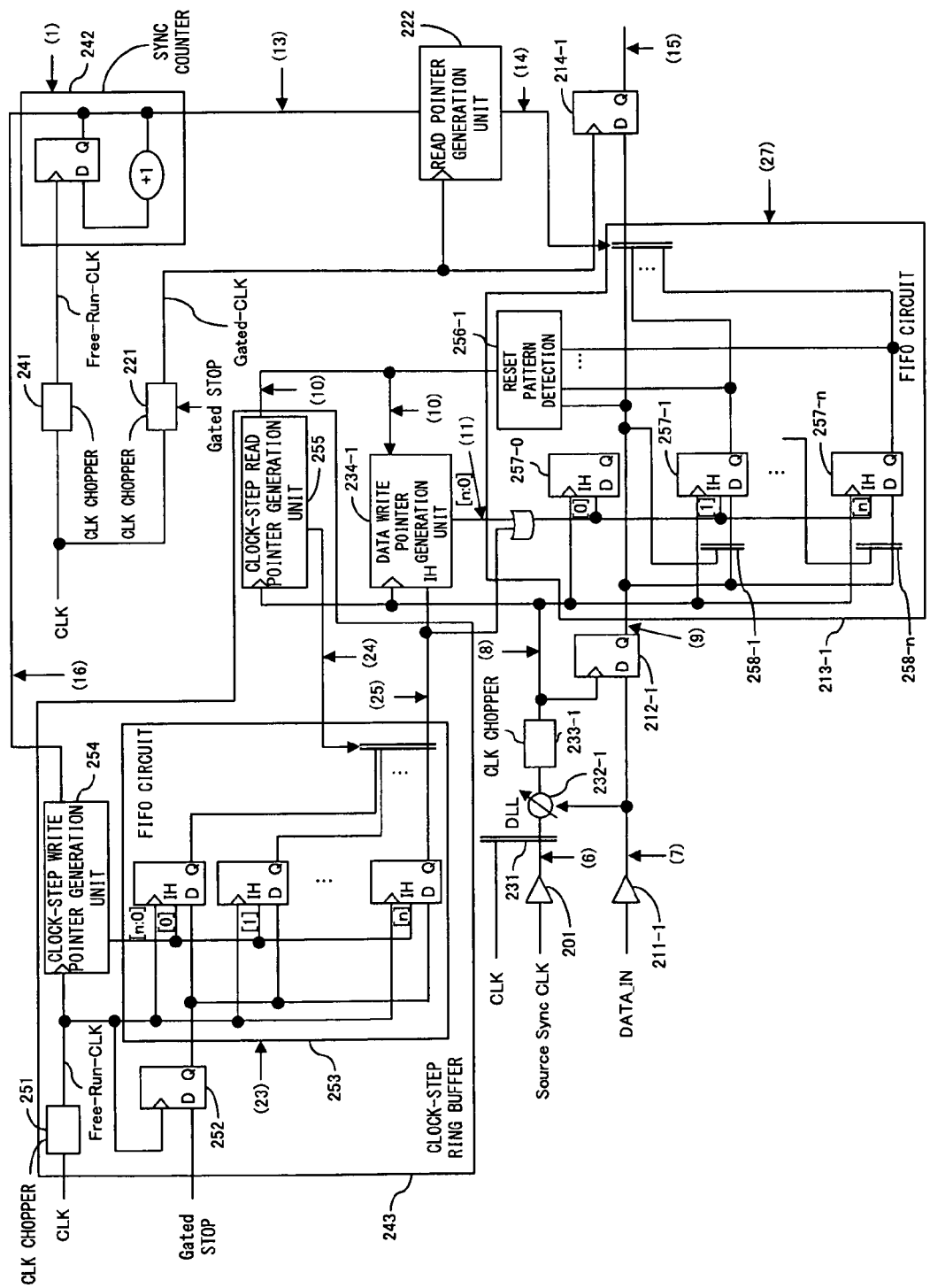
FIG. 6 is a diagram illustrating details of the configuration of the receiver end LSI in FIG. 4.

FIG. 6 and FIG. 7 are explained next. These drawings illustrate details of the configuration of the receiver end LSI 200 in FIG. 4. FIG. 6 shows details of the configuration of the receiver end LSI 200 from which the transmission check unit 244 is omitted, and FIG. 7 shows details of the configuration of the transmission check unit 244.

FIG. 6 is explained first. Note that among the components shown in FIG. 4, because every DLL 232-1, ..., 232-m have the same configuration, as do the cross choppers 233-1, ..., 233-m, the IO buffer 211-1, ..., 211-m the D-latches 212-1, ..., 212-m, the FIFO circuits 213-1, ..., 213-m, the write pointer generation unit 234-1, ..., 234-m, and the D-latches 214-1, ..., 214-m, FIG. 6 only shows the DLL 232-1, the cross choppers 233-1, the IO buffer 211-1, the D-latches 212-1, the FIFO circuits 213-1, the write pointer generation unit 234-1, and the D-latches 214-1 for simplicity. In the following description, the explanation is provided in accordance with the configuration shown in FIG. 6.

A clock-step ring buffer 243 comprises a clock chopper 251, a D-latch 252, a FIFO circuit 253, a clock-step write pointer generation unit 254, and a clock-step read pointer generation unit 255.

The internal clock of the receiver end LSI 200 is input in the clock chopper 251. The gated stop signal is input to the D-latch 252. The D-latch 252, when the chopper signal from the clock chopper 251 is input to the clock terminal, outputs the gated stop signal to input the gated stop signal to the FIFO circuit 253.

The clock-step write pointer generation unit 254 generates write pointers that point to any of the plural buffers in the FIFO circuit 253, and the write pointers are switched so as to point to another buffer successively in accordance with the timing of the chopper signals from the clock chopper 251. Meanwhile, the clock-step read pointer generation units 255 generates read pointers that point to any of the plural buffers in the FIFO circuits 253, and the read pointers are switched so as to point to another buffer successively in accordance with the timing of the chopper signal output from the clock chopper 233-1. The order of the switching should be the same as the order of the switching of the clock-step write pointer generation unit 254.

The timing of the signal change of the gated stop signal delayed by the clock-step ring buffer 243 is synchronized with the transmission clock.

Note that the clock-step write pointer generation unit 254 initializes (resets) the write pointers to be generated at the same timing as the initialization of the read pointer generation unit 222. The clock-step read pointer generation unit 255 initializes (resets) the read pointers to be generated at the same timing as the initialization of the write pointer generation unit 234-1. As a result, it is possible to provide a delay with an amount corresponding to the delay caused by the data transmission from the transmitter end LSI 100 and the receiver end LSI 200 to the gated stop signal.

In distinction from the clock-step ring buffer 243, hereinafter the ring buffer comprising the FIFO circuits 213-1, ..., 213-m is referred to as a "data ring buffer", the write pointer generation units 234-1, ..., 234-m are referred to as "data write pointer generation units 234-1, ..., 234-m", and the read pointer generation unit 222 is referred to as a "data read pointer generation unit 222".

It should be noted that each of the clock-step ring buffer 243 and data ring buffer has the same number of buffer stages.

Next, a reset pattern detection unit 256-1 in the FIFO circuit 231-1 illustrated in FIG. 6 is explained. Every FIFO circuits 213-1, ..., 213-m has the same internal configuration.

The D-latches 257-0, 257-1, ..., 257-n are (n+1) units of buffers in the FIFO circuit 213-1. In order to detect the reset pattern in the FIFO circuit 213-1, selectors 258-1, ..., 258-n are switched, D-latches 257-0, 257-1, ..., 257-n are connected in cascade, and as a result an (n+1) bit shift register is constructed.

The reset pattern detection unit 256-1 detects whether the output of each bit in the shift register comprising the D-latches 257-0, 257-1, ..., 257-n and the predetermined reset pattern agree or not. If the agreement of the two is detected, a detection signal is output. As described above, in response to the detection signal, the data write pointer generation unit 234-1 and the clock-step read pointer generation unit 255 are initialized.

Next, details of the configuration of the transmission check unit 244 illustrated in FIG. 7 are explained. Assume that an ExOR circuit 271, an AND circuit 274, and a flag circuit 277 in FIG. 7 are provided in every F latches 214-1, ..., 214-m.

The check pattern transmitted from the transmitter end LSI 100 to the receiver end LSI 200 is input to the transmission check unit 244 from any one of the D-latches 214-1, ..., 214-m illustrated in FIG. 4. The check pattern is input to the shift register 261 and to one of the input of the ExOR (exclusive OR) circuit 271.

The check pattern detection circuit 262 detects whether the output of each bit (i.e. check pattern) in the shift register 261 and the predetermined check pattern agree or not. When the agreement of the two is detected, a detection signal is output.

The flag circuit 263 sets a flag CHK_VAL in response to the reception of the detection signal from the check pattern detection circuit 262. The transmission check counter 264 is a counter for timekeeping of the time elapsed from the setting of the flag CHK_VAL, and outputs an end signal after certain time k is elapsed. In response to reception of the end signal, the flag circuit 265 sets flag COMPLETE and displays the completion of the check pattern test. Note that the OR circuit 266 passes the completion of the check pattern test to the flag circuit 263 in order to reset the flag CHK_VAL.

A synchronous counter 272 is a counter operative in synchronization with the cycle of the synchronous counter 124 of the transmitter end LSI 100. A check pattern expected value generation circuit 273 generates a check pattern, and outputs the generated check pattern that is added with an amount of delay logically arisen during the transmission of the check pattern from the pattern generation circuit 123 in the transmitter end LSI 100 to the ExOR circuit 271. The amount of delay is added based on the synchronous counter 272.

Another input of the ExOR circuit 271 is the check pattern expected value that is output from the check pattern expected value generation circuit 272. Accordingly, the ExOR circuit 271 detects disagreement of the check pattern and the check pattern expected value.

The AND circuit 274 extracts the detection result of the ExOR circuit 271 during a period when the flag CHK_VAL is set, i.e. a period when the check pattern test is in execution, as a valid result. The extracted result is the check pattern test result, and the disagreement of the check pattern expected value with the transmitted check pattern means a transmission error.

The OR circuit 275 outputs a detection signal if one transmission error is detected in the above check pattern test executed in the data transmission path passing through each of the D-latches 214-1, ..., 214-m. The flag circuit 276 sets a flag ERROR and displays error detection in response to reception of the detection signal from the OR circuit 275. The above flag circuit 277 provided in each of the transmission paths displays a flag in accordance with the output of the AND circuit 274, and indicates which of the data transmission paths is used for transmitting the error-detected check pattern.

It should be noted that the count cycles of the synchronous counters 124, 242, and 272 are twice as much as the number of buffer stages in the clock-step ring buffer 243 and the data ring buffer.

An initialization sequence that needs to be executed at the time of data transmission in the data transmission system illustrated in FIG. 4 is explained next.

The initialization sequence is executed by successively executing three processes: a tuning process, a pointer reset process, and a transmission check process. In the tuning process, the amount of delay of the transmission clock generated by the DLL 232-1, ..., 232-m are adjusted. In the pointer reset process, the clock-step write pointer generation unit 254, the clock-step read pointer generation unit 255, the data write pointer generation units 234-1, ..., 234-m, and the data read pointer generation unit 222 are initialized. In the transmission check process, data transmission from the transmitter end LSI 100 to the receiver end LSI 200 is checked.

Figure 8:
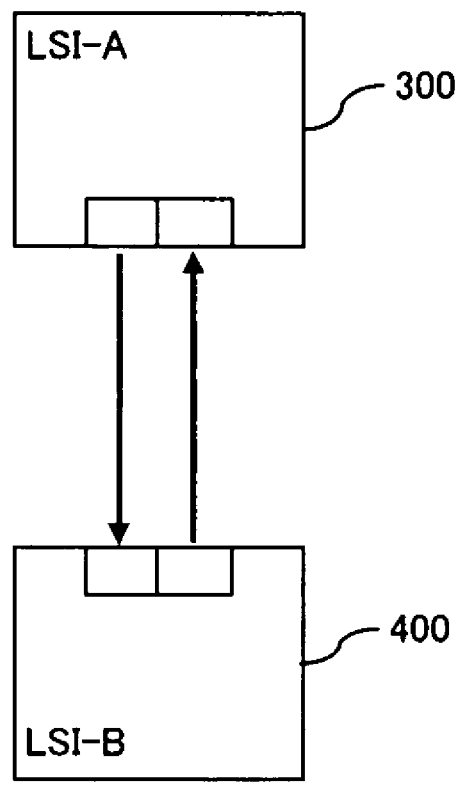
FIG. 8 is a diagram showing a state in which transmission/reception of parallel data between LSI-A and LSI-B are performed in parallel.

It should be noted that the following description explains an initialization sequence for data transmission by a data bus performed in parallel with transmission/reception of parallel data between LSI-A300 and LSI-B400 illustrated in FIG. 8. In this case, each of the LSI-A300 and LSI-B400 has both configurations of the transmitter end LSI 100 and the receiver end LSI 200 as illustrated in FIG. 4.

Figure 9:
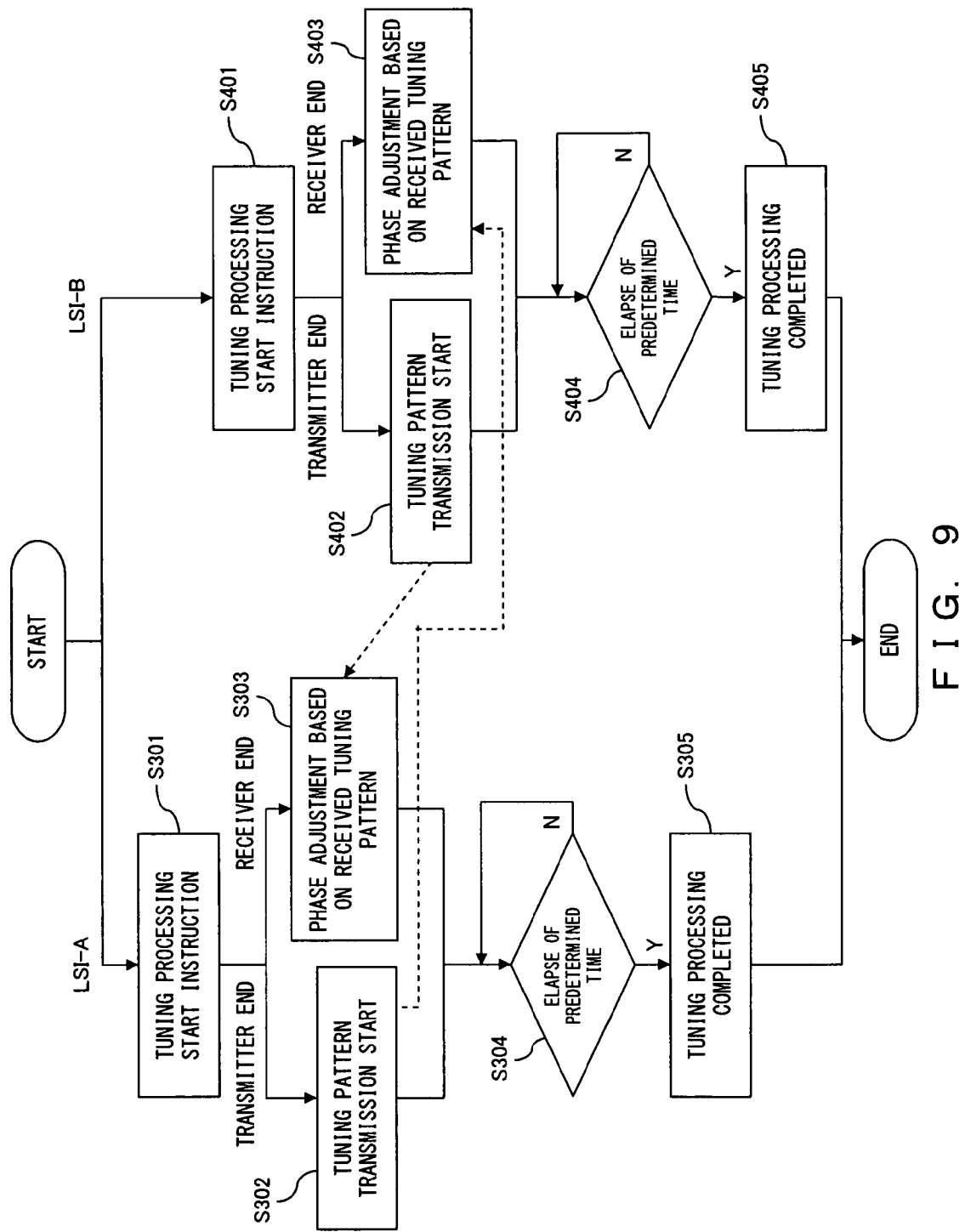
FIG. 9 is a diagram showing the processing procedures of the tuning processing.
Figure 10:
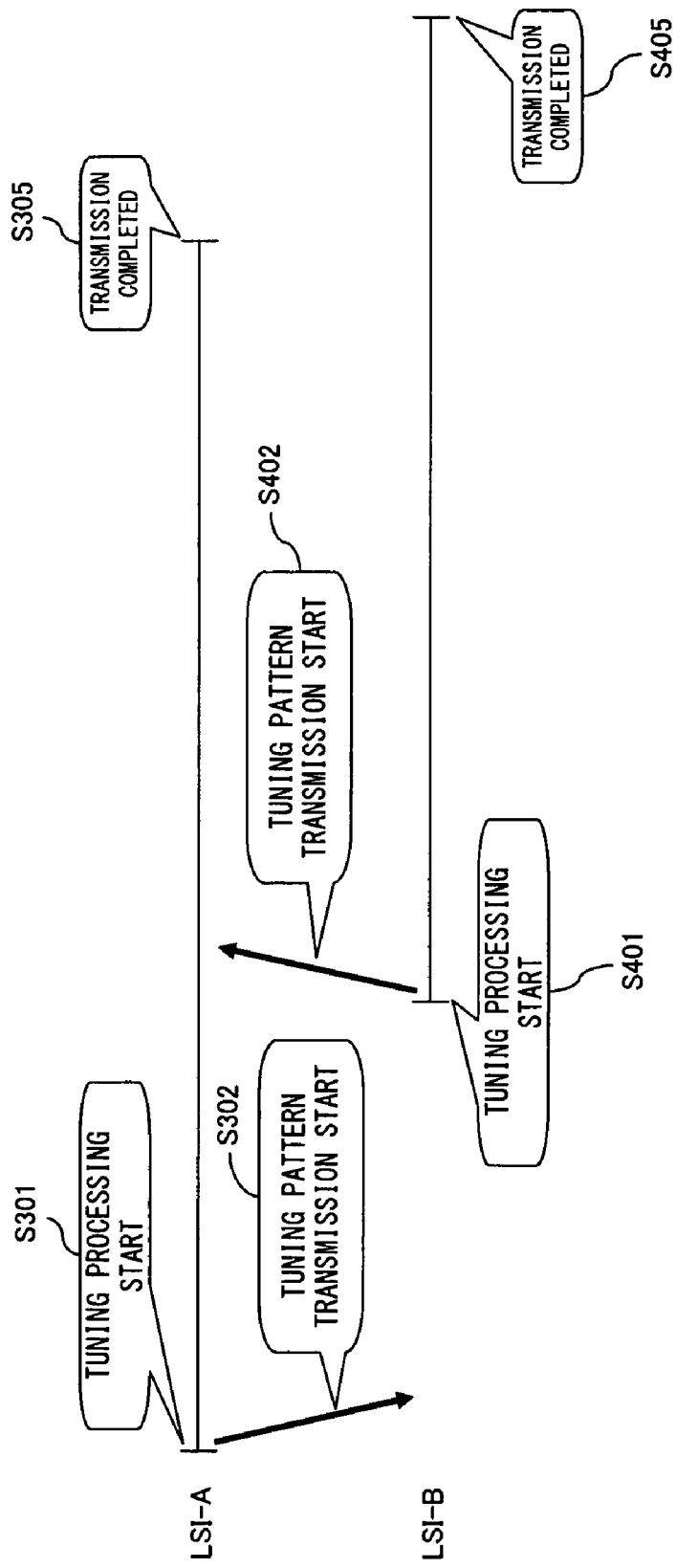
FIG. 10 is a diagram showing a state in which transmission/reception of pattern data as a result of execution of the tuning processing between the LSI-A and LSI-B.

The tuning process is explained first. Procedures of the tuning process are shown in a flowchart of FIG. 9. Transmission/reception of pattern data in response to the execution of the tuning process between the LSI-A300 and the LSI-B400 is shown in FIG. 10.

First, a start instruction of the tuning process is issued from an external controller to the LSI-A300. The LSI-A300 performs processing to obtain the start instruction in S301.

Upon obtaining the start instruction, the LSI-A300, in S302, starts processing to cause the pattern generation circuit 123 to generate a tuning pattern which is one of predetermined pattern data at the same time as switching the selectors 125-1, ..., 125-m, and processing to transmit the tuning pattern to LSI-B400. In S303, the tuning pattern transmitted from the LSI-B400 is received and provided to the DLL 232-1, ..., 232-m, and processing (calibration processing) to control the amount of delay provided to the transmission clock based on a detection result of the phase relation between the tuning pattern and the delayed transmission clock is performed in parallel with the processing in S302.

Meanwhile, a start instruction of the tuning process is also issued from the external controller to the LSI-B400. The LSI-B400 performs processing to obtain the start instruction in S401. Upon obtaining the start instruction, in S402, processing to transmit a tuning pattern to the LSI-A300 is started in the same manner as S302. In S403, calibration processing that is the same as the processing in S303 based on the tuning pattern transmitted from the LSI-A300 is performed in parallel with the processing in S402.

Afterwards, in the LSI-A300, processing of S302 and processing of S303 are continued until a predetermined time period (a time period that is sufficient to complete calibration processing) elapses in S304. When elapse of the predetermined time period is detected, in S305, the tuning pattern transmitting processing and calibration processing are ended and the tuning process is completed. On the other hand, in the LSI-B400, processing of S402 and processing of S403 are continued until a predetermined time period (a time period that is sufficient to complete calibration processing) elapses in S404. When elapse of the predetermined time period is detected, in S405, the tuning pattern transmitting processing and calibration processing are ended and tuning process is completed.

Note that the tuning processing is activated earlier in the LSI-A300 than in the LSI-B400 in FIG. 10; however, the activation order can be in reverse order.

Figure 11:
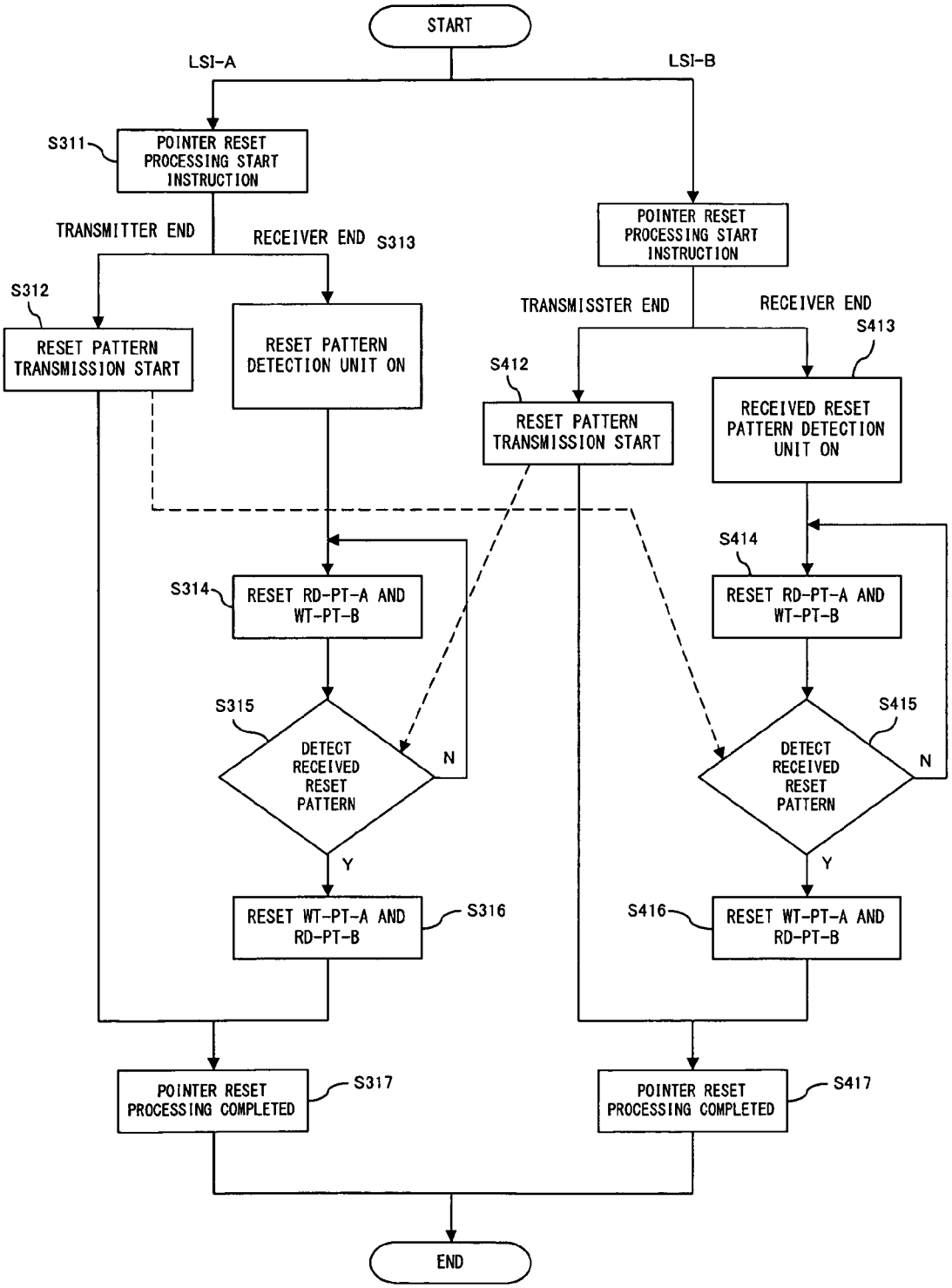
FIG. 11 is a diagram showing the processing procedures of the pointer reset processing.
Figure 12:
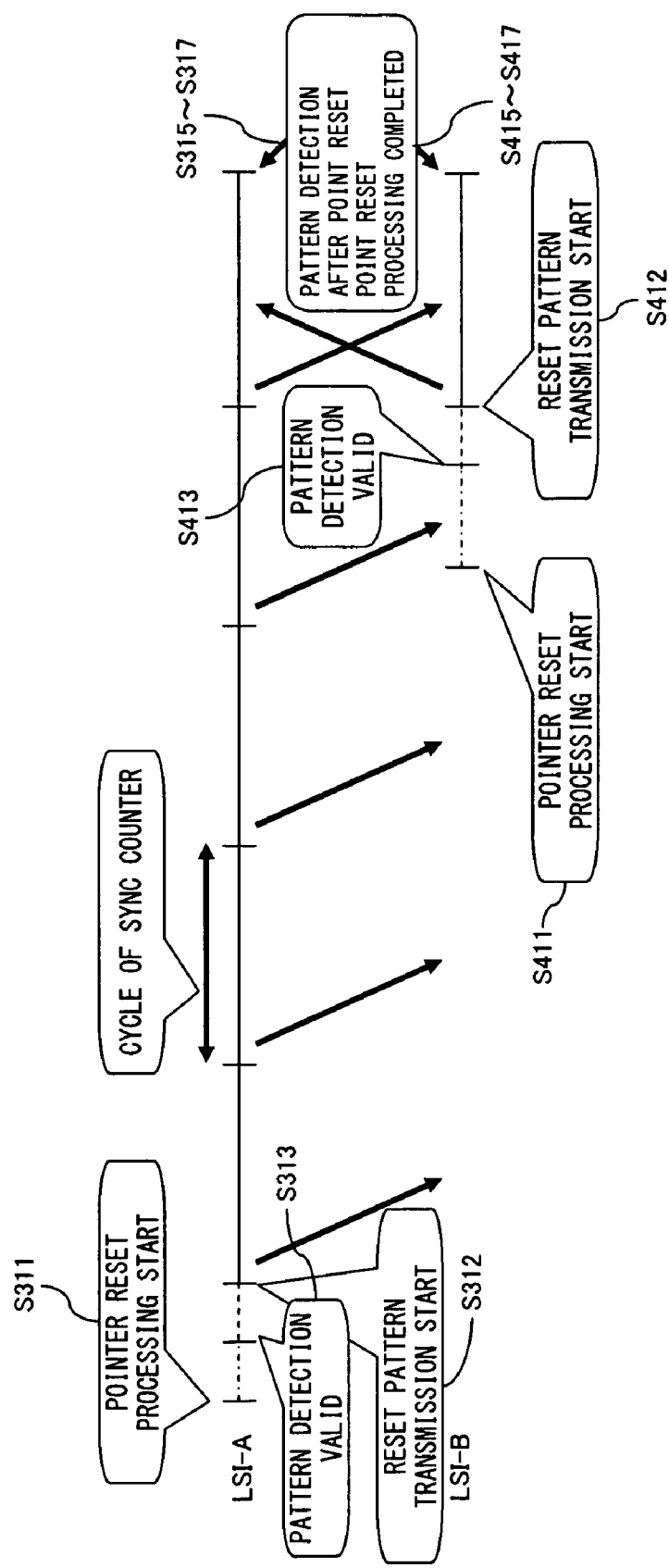
FIG. 12 is a diagram showing a state in which transmission/reception of pattern data as a result of execution of the pointer reset processing between the LSI-A and LSI-B.

The pointer reset process is explained next. Procedures of the pointer reset process are shown in a flowchart of FIG. 11. Transmission/reception of pattern data in response to the execution of the pointer reset process between the LSI-A300 and the LSI-B400 is shown in FIG. 12.

Note that in the following, in order to simplify the description, the data write pointer generation units 234-1, ..., 234-m are indicated as "WT-PT-A", the data read pointer generation unit 222 is indicated as "RD-PT-A", the clock-step write pointer generation unit 254 is indicated as "WT-PT-B", and the clock-step read pointer generation unit 255 is indicated as "RD-PT-B".

First, a start instruction of the pointer reset process is issued from an external controller to the LSI-A300. The LSI-A300 performs processing to obtain the start instruction in S311.

Upon obtaining the start instruction, the LSI-A300, in S312, starts processing to cause the pattern generation circuit 123 to generate a reset pattern which is one of predetermined pattern data at the same time as switching the selectors 125-1, ..., 125-m, and processing to transmit the reset pattern to LSI-B400. In S313, processing to activate the reset pattern detection unit 256-1 provided in each of the FIFO circuits 213-1, ..., 213-m is conducted in parallel with the processing in S312. Note that in activating the reset pattern detection unit 256-1, processing to switch the selectors 258-1, ..., 258-m and forming a shift register with the D-latches 257-0, ..., 257-n is conducted at the same time.

In the following S314, processing to reset (initialize) the RD-PT-A and WT-PT-B that is a pointer generation units for switching generated pointers in accordance with the internal clock of the LSI-A300 is conducted at the timing of the end of the period of the synchronous counter 242. Immediately after the reset, in S315, processing to determine whether the reset pattern detection unit 256-1 detected the reset pattern from the LSI-B400 or not is conducted. When the reset pattern is not detected, the process is returned to S314, and reset of the RD-PT-A and WT-PT-B in accordance with the synchronous counter 242 is conducted again.

Meanwhile, when the reset pattern is detected, the process is immediately proceeded to S316, and processing to reset (initialize) the WT-PT-A and the RD-PT-B that are pointer generation unit for switching generated pointers in accordance with the transmission clock transmitted from the LSI-B400 is conducted.

As a result, the clock-step ring buffer 243 of the LSI-A300 delays the gated stop signal by a time period corresponding to a time from generation of the reset pattern in the pattern generation circuit 123 of the LSI-B400 to detection of the reset pattern in the reset pattern detection unit 256-1 of the LSI-A300. The delayed gated stop signal is used for stopping the operation of the data ring buffer in the clock-step execution function. Consequently, according to the present embodiment, the transmission data from the LSI-B400 to the LSI-A300 can be securely stored in the data ring buffer without losing the data.

On the other hand, in the LSI-B400, the same processing as the above-explained processing in the LSI-A300 is conducted.

In other words, first, when a start instruction of pointer reset is issued from an external controller to the LSI-B 400, the LSI-B 400 performs processing to obtain the start instruction in S411.

Upon obtaining the start instruction, the LSI-B 400, in S412, starts processing to cause the pattern generation circuit 123 to generate a reset pattern, and processing to transmit the reset pattern to LSI-A 300. In S413, processing to activate the reset pattern detection unit 256-1 provided in each of the FIFO circuits 213-1, ..., 213-m is conducted in parallel with the processing in S412.

In the following S414, processing to reset the RD-PT-A and WT-PT-B is conducted at the timing of the end of the period of the synchronous counter 242. Immediately after the reset, in S415, processing to determine whether the reset pattern detection unit 256-1 detected the reset pattern from the LSI-A 300 or not is conducted. When the reset pattern is not detected, the process is returned to S414, and reset of the RD-PT-A and WT-PT-B in accordance with the synchronous counter 242 is conducted again.

Meanwhile, when the reset pattern is detected, the process is immediately proceeded to S416, and processing to reset (initialize) the WT-PT-A and the RD-PT-B is conducted.

As a result, the clock-step ring buffer 243 of the LSI-B 400 delays the gated stop signal by a time period corresponding to a time from generation of the reset pattern in the pattern generation circuit 123 of the LSI-A 300 to detection of the reset pattern in the reset pattern detection unit 256-1. The delayed gated stop signal is used for stopping the operation of the data ring buffer in the clock-step execution function. Consequently, according to the present embodiment, the transmission data from the LSI-A 300 to the LSI-B 400 can be securely stored in the data ring buffer without losing the data.

It should be noted that the pointer reset processing is activated earlier in the LSI-A 300 than in the LSI-4B00 in FIG. 12; however, the activation order can be in reverse order.

Figure 13:
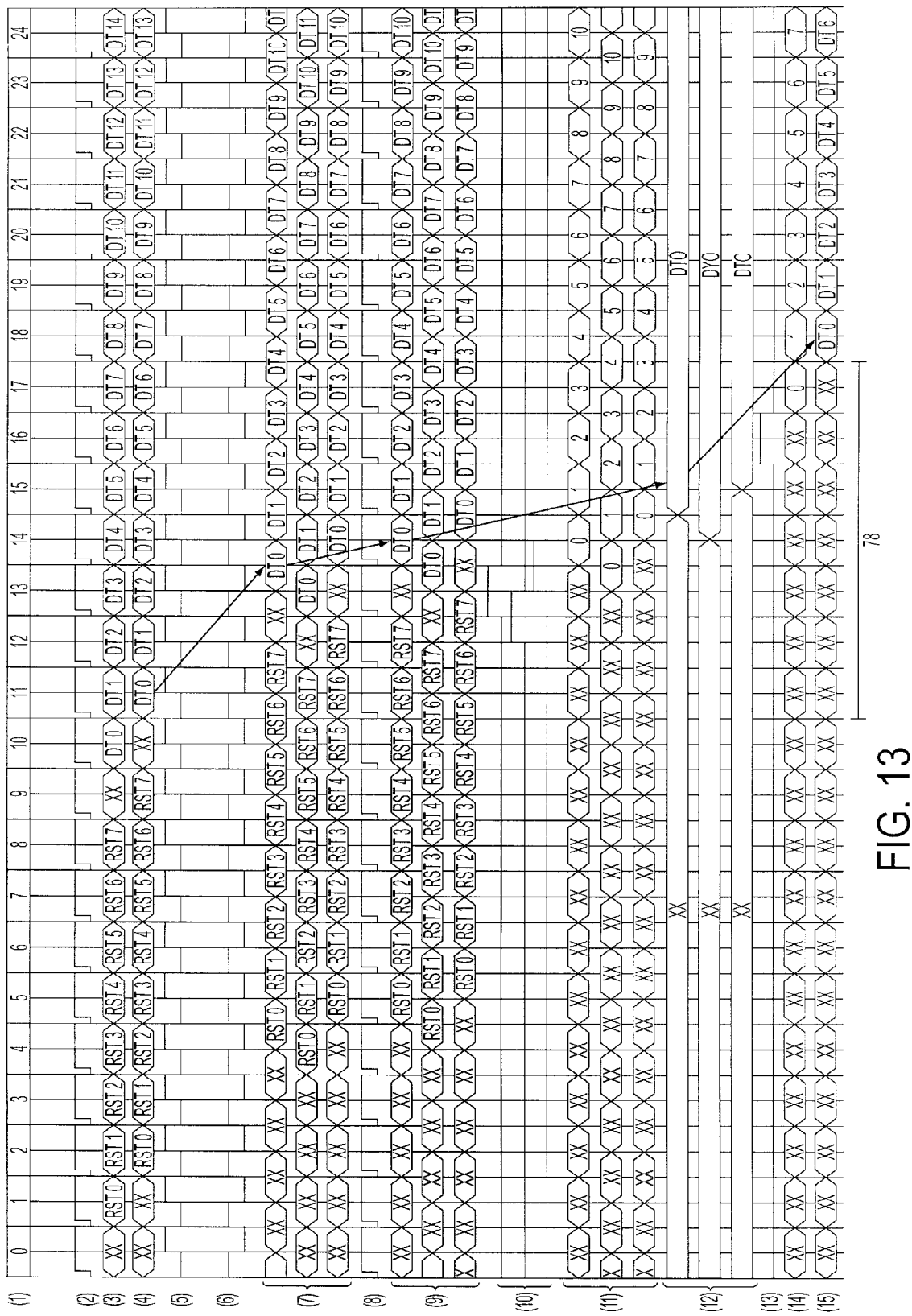
FIG. 13 is a diagram (1) showing an example of a time chart of reset timing of each pointer generation unit.
Figure 14:
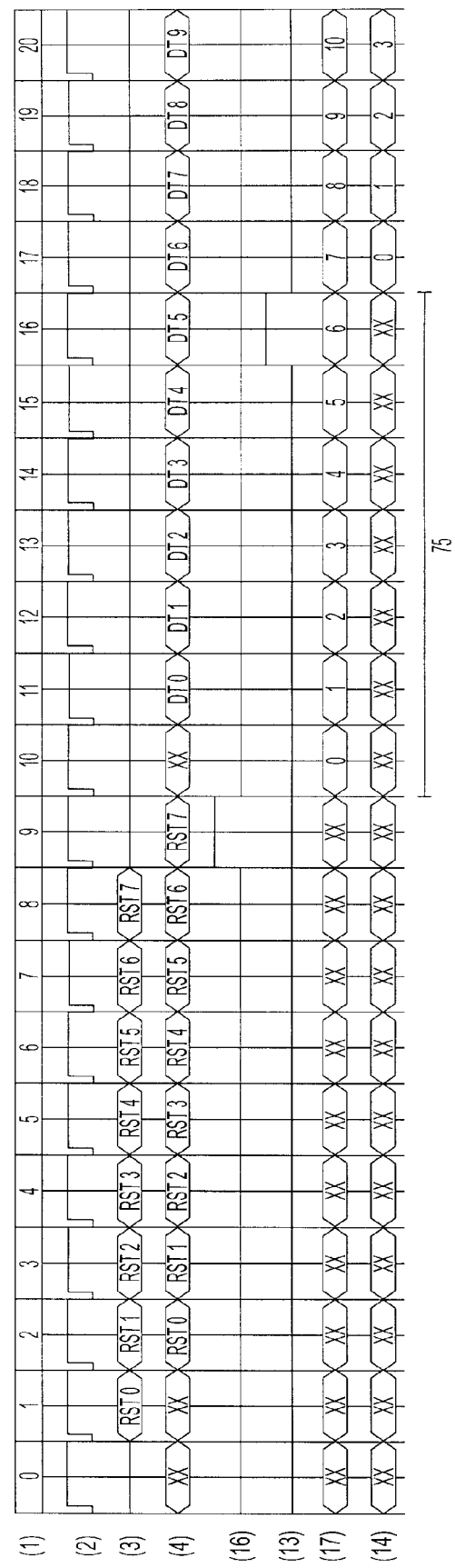
FIG. 14 is a diagram (2) showing an example of a time chart of reset timing of each pointer generation unit.

FIG. 13 and FIG. 14 are explained. These drawings show examples of the time chart of the reset timing of each of the pointer generation units. Note that correspondence between the charts shown in FIG. 13 and FIG. 14 and the charts shown in FIG. 5 and FIG. 6 is indicated by parenthesized numbers (1)-(17). In these examples of the time chart, the clock-step ring buffer 243 and the data ring buffer consists of 16 stages of buffers, and consequently, the count period of the synchronous counter is 32. Bit length of the reset pattern generated in the pattern generation circuit 123 is 8 bits (RST0-RST7).

FIG. 13 shows the reset timings of the WT-PT-A and RD-PT-B and RD-PT-A.

Each of a chart (1) through a chart (4) of FIG. 13 is discussed first.

The chart (1) represents a count period of the synchronous counters 124, 242, and 272, the chart (3) represents the output data of the selector 125-1. The chart (4) represents output data of the D-latch 113-1 in the last stage of the transmitter end LSI 100. Note that the chart (5) represents the internal clock of the transmitter end LSI 100, and the chart (2) represents the output signal of the clock chopper 121.

The pattern generation circuit 123 starts outputting the reset pattern when the count value of the synchronous counter 124 (the chart (1)) is "1" (see the chart (3)). The head bit of the reset pattern is latched by the D-latch 113-1 at the timing when the count value of the synchronous counter 124 becomes "2" (see the chart (4)).

Each of the chart (6) through the chart (12) is discussed next.

The chart (6) represents the output signal of the IO buffer 201, and the chart (8) represents an output signal output from the clock chopper 233-1. Although the phases of these signals are drawn as if they are inverted in FIG. 13, this is due to the phase adjustment of the transmission clock by the DLL 232-1 based on the transmission data shown in the upper stage of the chart (8). Accordingly, the phase of the waveform in the chart (8) coincides to the phase of the output signal waveform (the chart (2)) of the clock chopper 121 in the transmitter end LSI 100.

Each of the chart (7) and the chart (9) through the chart (12) has three kinds of charts. First, each chart in the top of the charts is discussed.

The chart (7) represents the output of the buffer 211-1 of the receiver end LSI 200, i.e. the transmission data from the transmitter end LSI 100 received in the receiver end LSI 200. The chart (9) represents the output data of the D-latch 212-1 in the first stage of the receiver end LSI 200. The chart (10) represents a detection signal output from the reset pattern detection unit 256-1, i.e. a reset signal that is shared by the WT-PT-A and the RD-PT-B.

The transmission data (the chart (7)) transmitted from the transmitter end LSI 100 is latched in the D-latch 212-1 (see the chart (9)). The D-latch 212-1 outputs all bit sequence (RST0-RST7) that serves as the reset pattern, and when the bit sequence is stored in the D-latch 257-0, ..., 257-n (here n=7) constituting the shift register, the reset pattern detection unit 256-1 outputs an H-level signal as a detection signal (see the chart (10)). Note that the count value of the synchronous counter 242 at that time is "13" (see the chart (1)).

The chart (11) represents the data write pointer output from the WT-PT-A. The chart (12) represents the data stored in the D-latch 257-0. Note that from among the D-latches 257-0, ..., 257-n constituting the data ring buffer the D-latch 257-0 is indicated when the pointer is "0".

The WT-PT-A is reset by the H-level signal of the chart (10), and subsequently when the H-level signal shifts to the L-level signal, the pointer value is successively incremented from the pointer value "0" (see the chart (11)).

Here, the data "DT0" from which a broken line arrow is started in FIG. 13 is taken as an example. The data is the first transmission data transmitted from the transmitter end LSI 100 when the selector 125-1 is switched after the pattern generation unit 123 transmits the reset pattern (see the chart (2)). The data is received by the receiver end LSI 200, is passed through the IO buffer 201 (see the chart (7)), and is stored in the D-latch 212-1 afterwards (see the chart (9)). At that time, because the WT-PT-A immediately after the reset outputs the pointer value "0" (see the chart (11)), the data "DT0" is stored in the D-latch 257-0 (see the chart (12)).

The chart (13) represents the reset signal of the RD-PT-A. The chart (14) represents the data read pointer output from the RD-PT-A. The chart (15) represents the data stored in the D-latch 214-0.

In the transmission system shown in FIG. 4, data is transmitted within 7 cycles (7τ) of the internal clock of the transmitter end LSI 100 from the D-latch 113-1 in the last stage of the transmitter end LSI 100 to the D-latch 214-1 in the first stage operated in accordance with the internal clock of the receiver end LSI 200. Accordingly, the RD-PT-A performs the reset after 7 cycles from the timing the D-latch 113-1 finishes the output of the reset pattern generated in the pattern generation unit 123 using the synchronous counter 242 (see the patterns (4) and (13)). Note that the count value of the synchronous counter 242 at that time is "16" that is after 7 cycles from the count value "9" (see the chart 1)).

As a result, the pointer value output from the RD-PT-A after the reset becomes "0" (see the pattern (14)), and the data "DT0" stored in the D-latch 214-0 is safely stored in the D-latch 214-1 at that time (see the pattern (15)).

It should be noted that the charts in the middle and in the bottom among each of the three kinds of charts shown in each chart of the chart (7) and the chart (9) through the chart (12) show cases in which delay generated on the transmission paths of each bit is different from the transmission paths of the bit shown in the chart in the top in the parallel data transmission from the transmitter end LSI 100 to the receiver end LSI 200. Specifically, the middle chart shows a case in which the delay is shorter by half of the transmission clock in the middle chart than that in the top chart, and the bottom chart shows a case in which the delay is longer by half of the transmission clock than in the top chart.

In the transmission system shown in FIG. 4, as shown in the chart (10), if the transmission delay of the parallel data is different between bits, the reset timing of the WT-PT-A changes in accordance with the delay of the transmission data. As a result, the switching timing of the data write pointer also changes in accordance with the delay of the transmission data (see the chart (11)). Accordingly, even in such a case, the data ring buffer does not lose the transmission data (see the chart (12)).

FIG. 14 is explained next. FIG. 14 represents the reset timing of the WT-PT-B and the RD-PT-A.

In FIG. 14, the chart (16) represents the reset signal of the WT-PT-B. The chart (17) represents the clock-step write pointer output from the WT-PT-B.

As described above, in the transmission system shown in FIG. 4, data is transmitted within 7 cycles ($7\tau$) of the internal clock of the transmitter end LSI 100 from the D-latch 113-1 in the last stage of the transmitter end LSI 100 to the D-latch 214-1 in the first stage operated in accordance with the internal clock of the receiver end LSI 200. Accordingly, the RD-PT-A performs the reset after 7 cycles from the timing the D-latch 113-1 finishes the output of the reset pattern generated in the pattern generation unit 123 using the synchronous counter 242 (see the patterns (4) and (13)). Meanwhile, the WT-PT-B performs the reset 7 cycles ($7\tau$) of the internal clock of the transmitter end LSI 100 earlier than the reset timing of the RD-PT-A, using the synchronous counter 242 (see the patterns (16) and (13)). Note that the count value of the synchronous counter 242 at that time is "9" that is 7 cycles before "16" (see the chart (1)).

As a result, at the time of the issue of the gated stop signal, the WT-PT-A can be stopped after all transmission data that has not been latched in the D-latch 113-1 among the transmission data that have been transmitted from the transmitter end LSI 100 to the receiver end LSI 200 is stored in the data ring buffer. In other words, the clock-step ring buffer, as a result, delays the gated stop signal by a time period required for the transmission data to be stored in the FIFO 213-1 from being transmitted from the transmitter end LSI 200.

Figure 15:
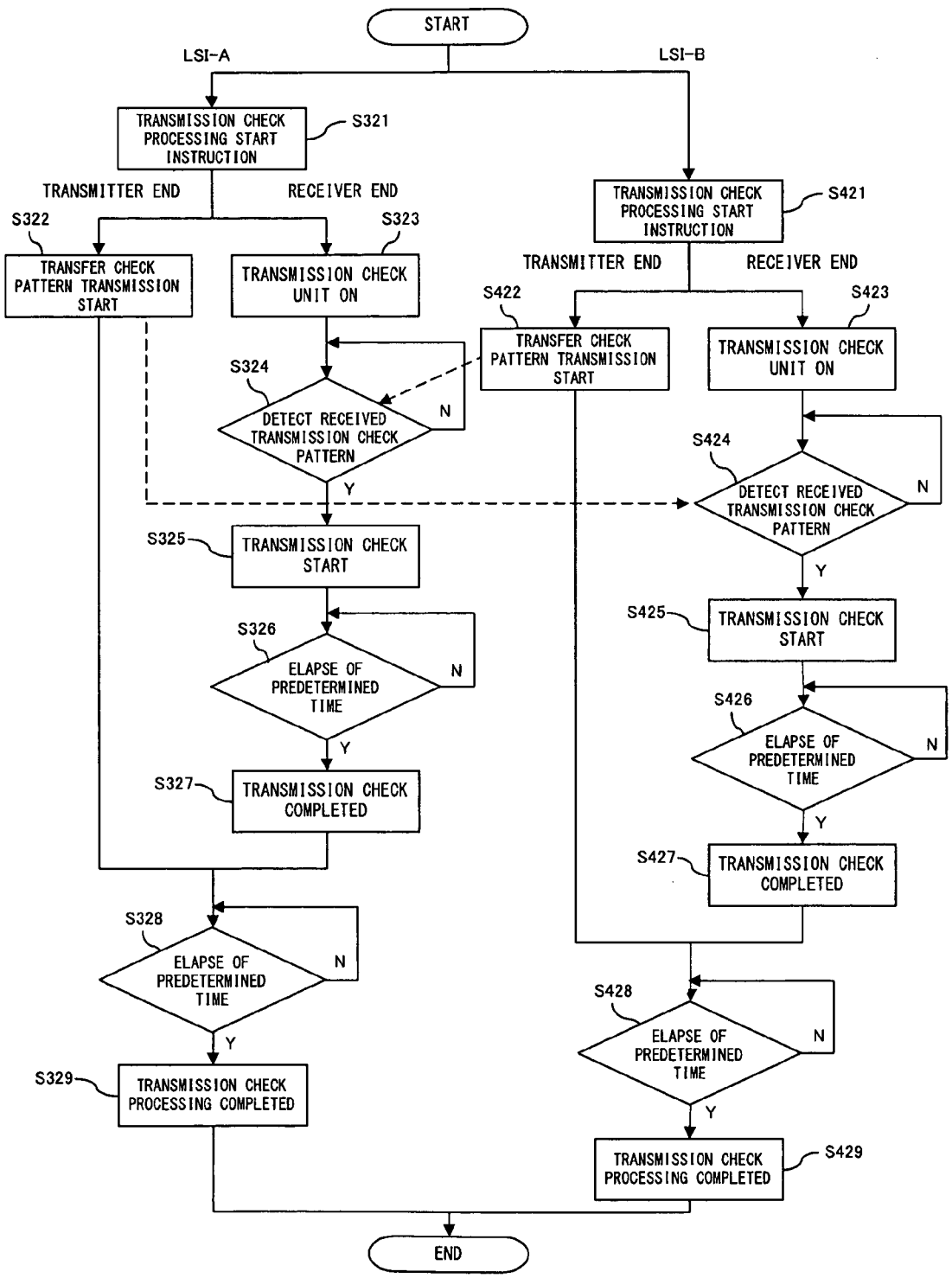
FIG. 15 is a diagram showing processing procedures of the transmission check processing.
Figure 16:
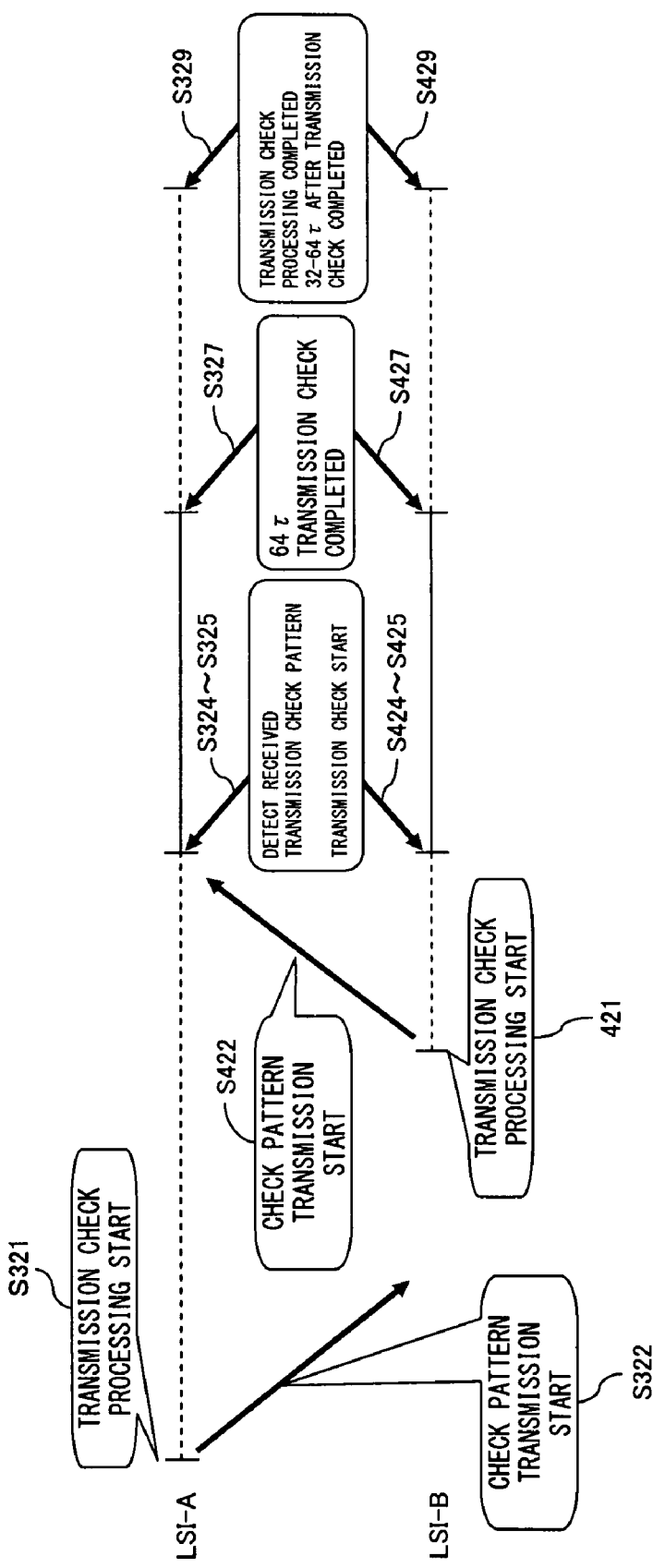
FIG. 16 is a diagram showing a state in which transmission/reception of pattern data as a result of execution of the transmission check processing between the LSI-A and LSI-B.

Next, the transmission check processing is explained. Procedures of the processing of the transmission check processing is shown in a flowchart in FIG. 15. FIG. 16 shows transmission/reception of the pattern data between the LSI-A300 and the LSI-B400 by the execution of the transmission check processing.

First, a start instruction of the transmission check processing is issued from an external controller to the LSI-A300. The LSI-A300, in S321, performs processing to obtain the start instruction.

Upon obtaining the start instruction, the LSI-A300, in S322, starts processing to cause the pattern generation circuit 123 to generate a check pattern that is one of predetermined pattern data, at the same time as switching the selectors 125-1, . . . , 125-m, and processing to transmit the check pattern to LSI-B400. In S323, processing to initialize and to operate the transmission check unit 244 is performed in parallel with the processing in S322.

In the following S324, processing to cause the check pattern detection circuit 262 to detect the check pattern transmitted from the LSI-B400 is performed. When the check pattern is detected, process is proceeded to S325.

In S325, transmission check to compare the detected check pattern with the check pattern expected value described above is started. In S326, processing to wait for a predetermined time is performed by means of the transmission check counter 264, and when the predetermined time has elapsed, the process proceeds to S327.

In S327, various flags set to the flag circuit 265, 276, and 277 are referred to by the external controller and the transmission check is ended. After continuing to send the check pattern started in S322 for a prescribed time period in S328, in S329, the check pattern sending is ended and the transmission check processing is ended.

Meanwhile, in the LSI-B400, the same processing as the processing in the LSI-A300 described above is performed.

In other words, first, a start instruction of the transmission check processing is also issued from the external controller to the LSI-B400. The LSI-B400 performs processing to obtain the start instruction in S421.

Upon obtaining the start instruction, in S422, the LSI-B400 starts processing to transmit a check pattern to the LSI-A300. In S423, processing to initialize and to operate the transmission check unit 244 is performed in parallel with the processing in S422.

In the following S424, the detection processing of the check pattern transmitted from the LSI-A300 is performed. When the check pattern is detected, the process proceeds to S425.

In S425, the transmission check to compare the detected check pattern with the check pattern expected value described above is started. Here, in S426, processing to wait for a predetermined time is performed, and when the predetermined time has elapsed, the process proceeds to S427.

In S427, various flags set to the flag circuit 265, 276, and 277 are referred to by the external controller and the transmission check is ended. After continuing to send the check pattern for a prescribed time period in S428, in S429, the check pattern sending is ended and the transmission check processing is ended.

It should be noted that the transmission check processing is activated earlier in the LSI-A300 than in the LSI-B400 in FIG. 16; however, the activation order can be in reverse order.

The external controller recognizes the transmission check result based on the various flags set in the flag circuits 265, 276, and 277. In a state of a flag COMPLETE being set, if a flag ERROR is not set, the result of the transmission check is "good", and if a flag ERROR is set, the result of the transmission check is "no good".

It should be noted that as the check pattern generated by the pattern generation circuit 123 in the transmission check processing described above, the number of buffer stages constituting the data ring buffer should be preferably at least twice as many (i.e. the number of the types of the pointer generated by the WT-PT-A). By doing so, because the data storage in and data reading from every buffer area are performed several times, reliability of the buffer test can be improved.

If the following bit sequence is used as the check pattern for example, further advantages can be obtained.

If the number of buffer stages (D-latches 257-0, ..., 257-n) constituting the data ring buffer is 16 stages, the bit sequence is as below.

00011101 00011101 11100010 11100010

If the number of the buffer stages constituting the data ring buffer is 24 stages, the bit sequence is as below.

00011101 00011101 00011101 11100010 11100010 11100010

The pattern length of these check patterns are twice as long as the ring buffer cycle period (the number of buffer stages), the latter half, when the pattern is divided into two, is an inversion of each bit "0" or "1" in the first half.

By employing such a bit sequence as a check pattern, deviation from the cycle of the data ring buffer can be detected in the transmission check unit 244. During the check, writing test/reading test for both of data "1" and data "0" can be performed to all buffers constituting the data ring buffer.

It should be noted that the check pattern can share the bit sequence with the tuning pattern explained earlier.

Figure 17:
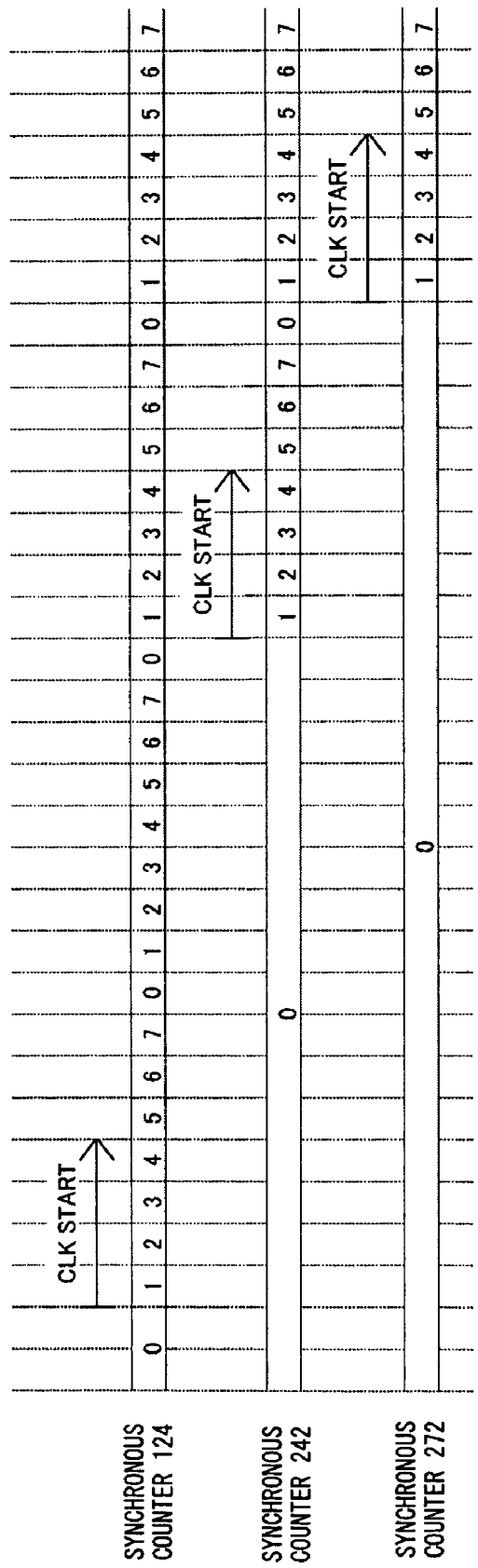
FIG. 17 is a diagram showing an example of start timing of count operation of each synchronous counter.

Both of the pointer reset processing and the transmission check processing described above is based on the premise of synchronous count performed by the synchronous counters 124, 242, and 272. For the synchronous count, the synchronous operation can be realized if an externally generated reference signal can be applied to the synchronous counters 124, 242, and 272 at the same time. However, it is probable that when the counting operations of the synchronous counters 124, 242, and 272 are started at the same time, stability of the power source is influenced. For that reason, as shown in FIG. 17, the counting operations of the synchronous counters 124, 242, and 272 are started at separate timings so that the influence on the power source stability can be reduced. By means of the start timings of counters having an interval being equal to the integral multiple of the counter cycle (8 counts in the example of timing in FIG. 17), the cycle of each counter can be synchronized and operated.

Next, operations of each unit of the transmission system shown in FIG. 4 at the time of the click step execution function are explained.

Figure 18A:
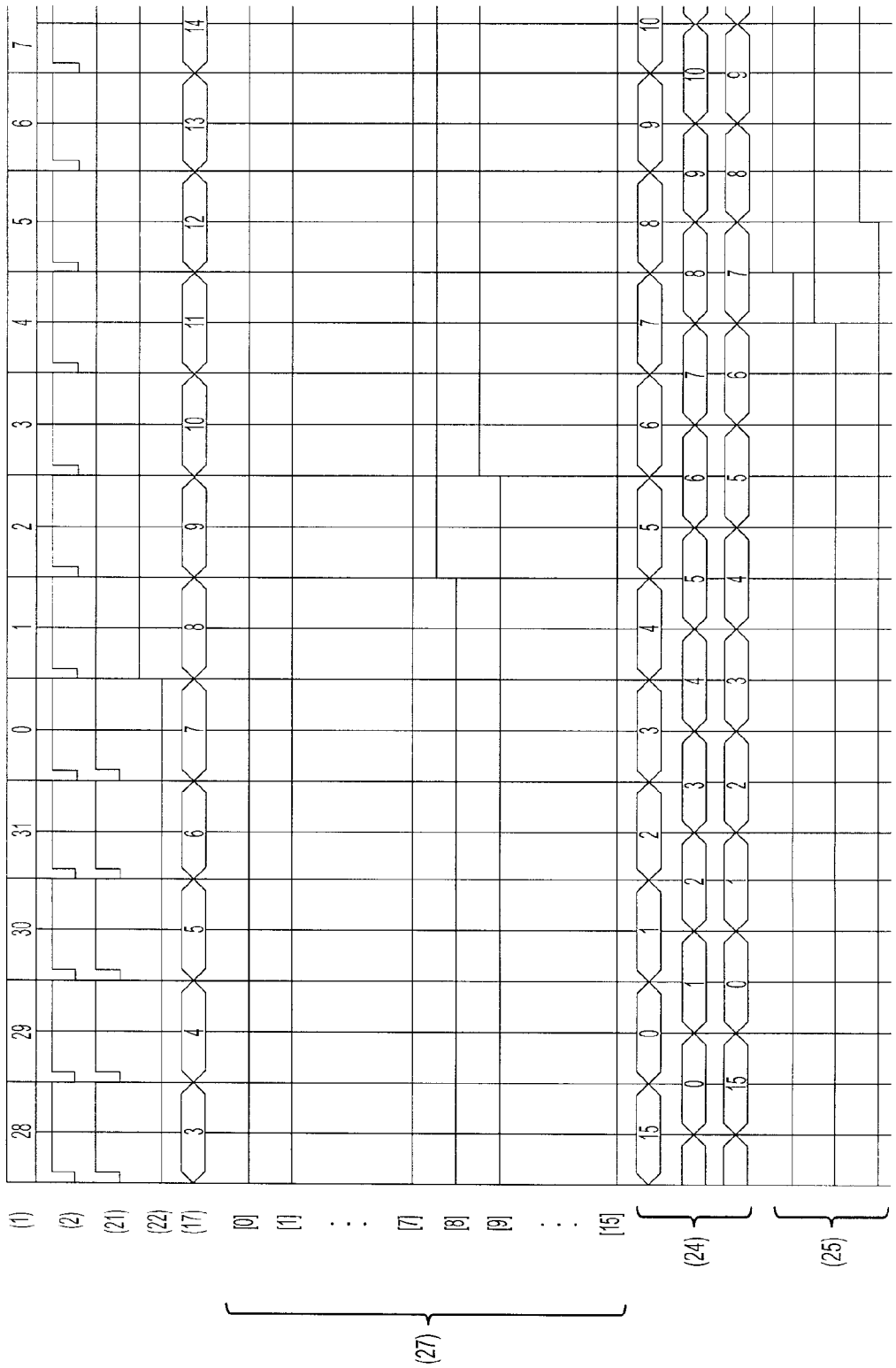
FIG. 18A is a diagram (1)-1 showing an example of a time chart at the time of clock-step execution function.
Figure 18B:
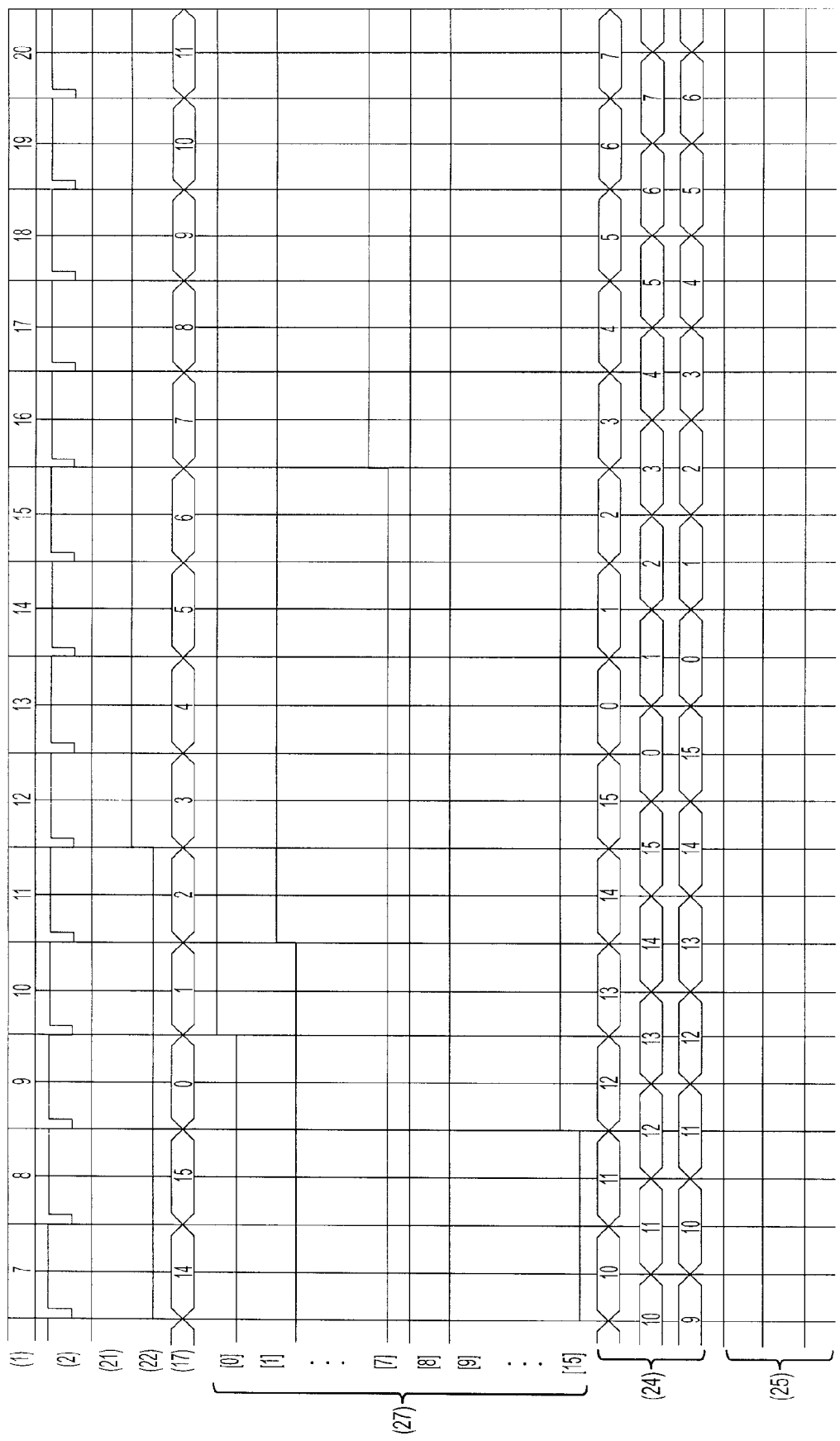
FIG. 18B is a diagram (1)-2 showing an example of a time chart at the time of clock-step execution function.
Figure 19A:
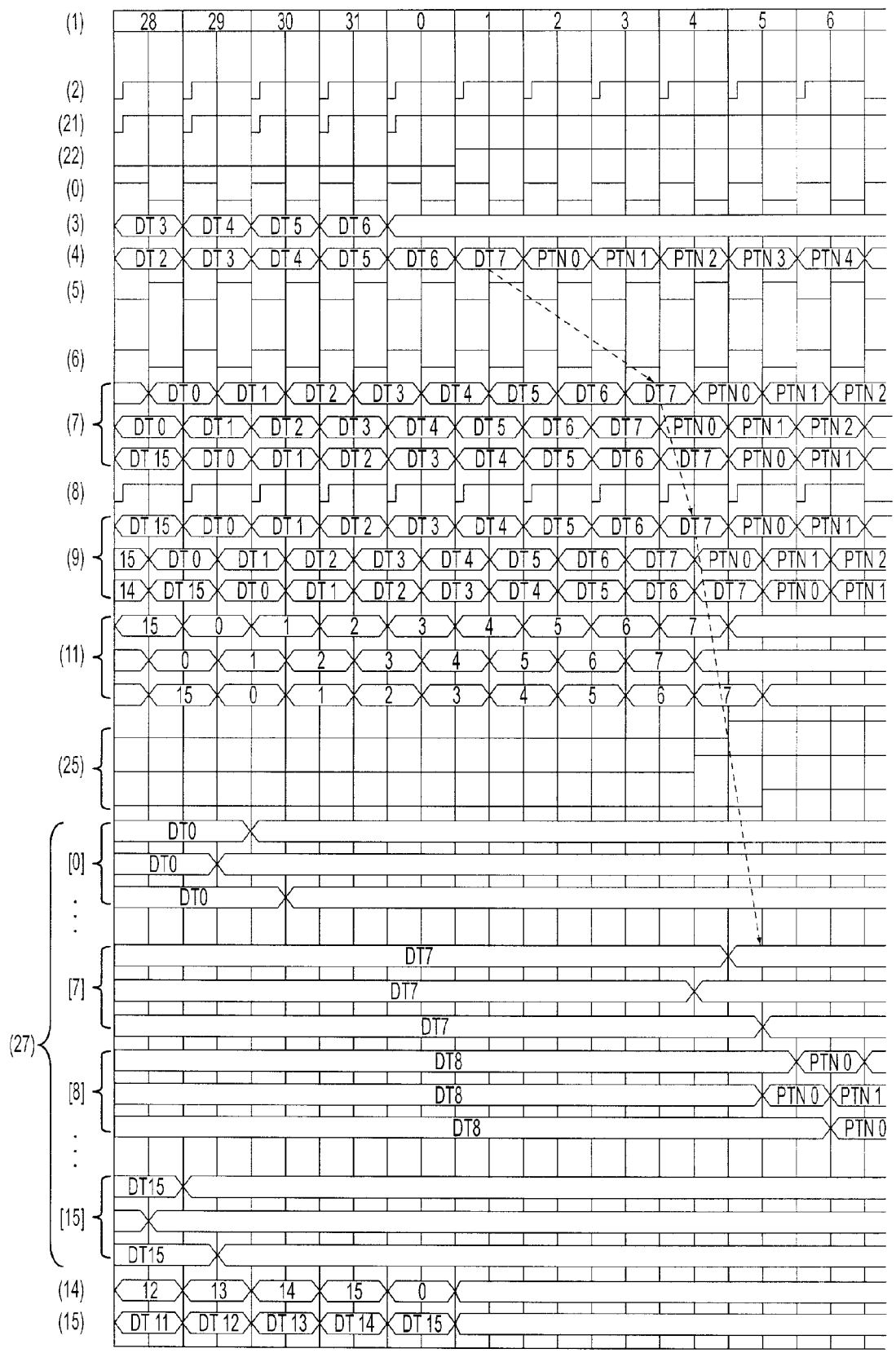
FIG. 19A is a diagram (2)-1 showing an example of a time chart at the time of clock-step execution function.
Figure 19B:
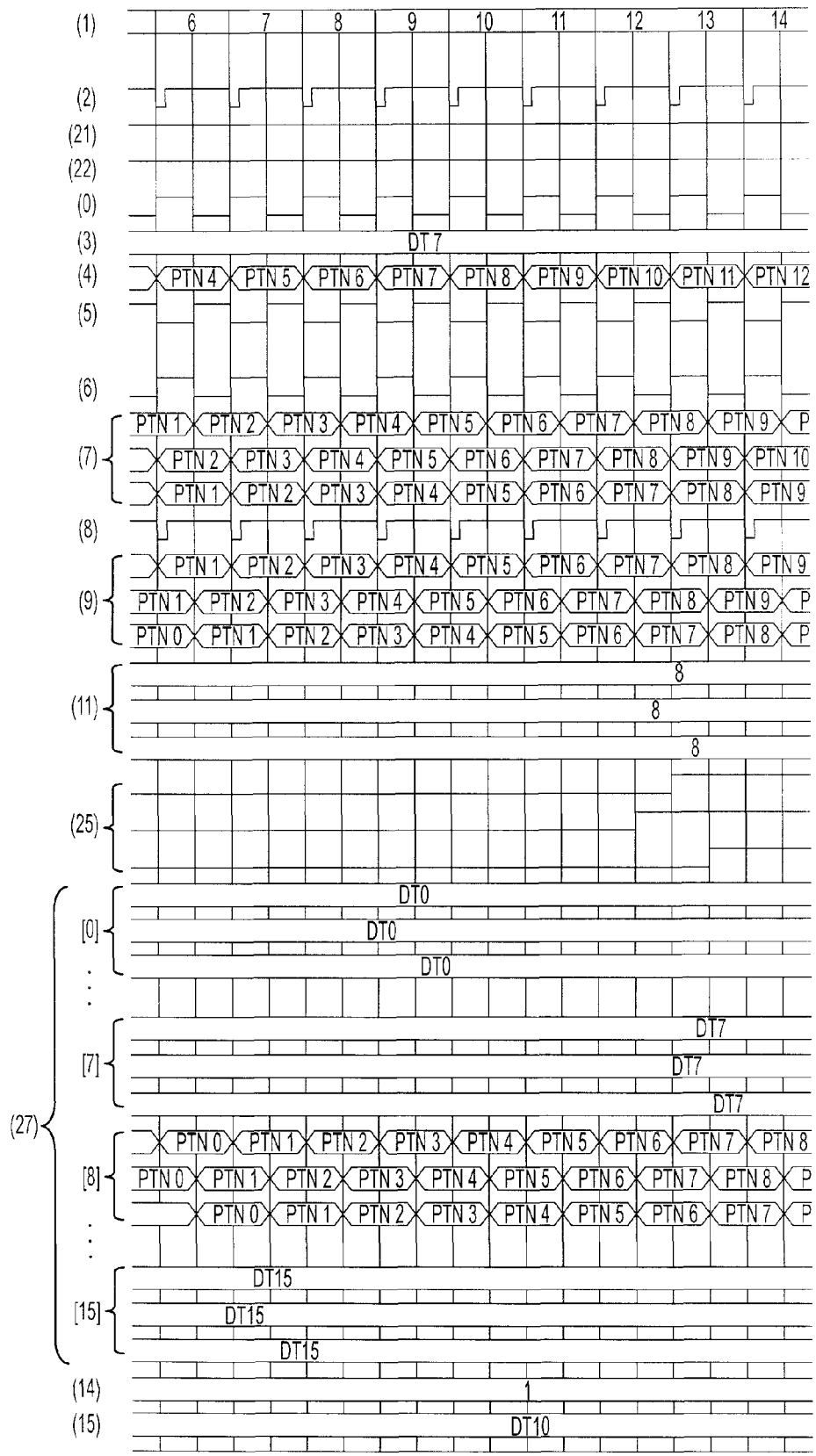
FIG. 19B is a diagram (2)-2 showing an example of a time chart at the time of clock-step execution function.
Figure 19C:
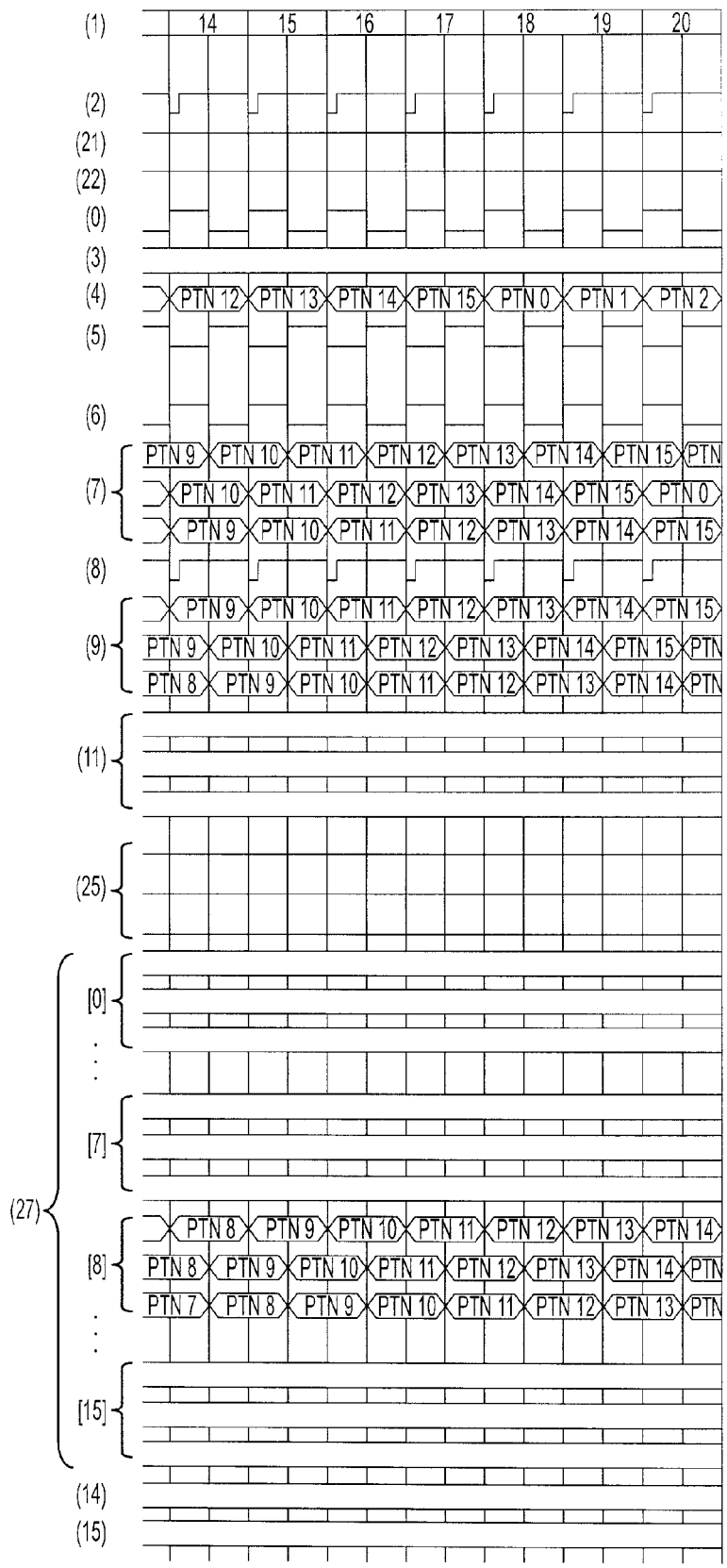
FIG. 19C is a diagram (2)-3 showing an example of a time chart at the time of clock-step execution function.

FIGS. 18A, 18B, 19A, 19B, and 19C show the examples of the time chart at the time clock-step execution function. Note that correspondence between each of the charts shown in these figures and FIG. 5 and FIG. 6 is indicated by numbers in parenthesis (1)-(17) and (21)-(26). Note that the chart (0) in FIGS. 19A, 19B, and 19C is not shown in FIG. 5 or FIG. 6. The chart (0) represents the inverted signal of the internal clock of the transmitter end LSI 100 (the chart (5)); however, the chart is not referred to in the following explanation.

It should be noted that these examples of time charts assume that each of the clock-step ting buffer 243 and the data ring buffer comprises 16 stages of buffers, and as a result, the count cycle of the synchronous counter is 32. It is also assumed that the bit length of the tuning pattern generated in the pattern generation circuit 123 is 16 bits (PTN0-PTN15).

FIGS. 18A and 18B are discussed first. In FIGS. 18A and 18B, the chart (21) represents the output waveform of the clock chopper 111, the chart (22) represents the gated stop signal. The chart (23) represents the contents of the data stored in each buffer constituting the clock-step ring buffer 243.

In FIGS. 18A and 18B, the gated stop signal is changed to the H-level signal at the timing that the WT-PT-B outputs a write pointer value "8" (see the charts (22) and (17)). As a result, in the chart (23), the stored data is changed from the L-level to the H-level in the order of [8], [9], ..., [15], [0], [1], in accordance with the switching of the write pointer value by the WT-PT-B.

The chart (24) represents the clock-step read pointer output from the RD-PT-B, and the chart (25) represents the output signal of the clock-step ring buffer 243, i.e. the delayed gated stop signal for stopping the WT-PT-A. Note that each of the charts (24) and (25) has three charts. These three charts show, like in FIG. 13, a state in which in the parallel data transmission from the transmitter end LSI 100 to the receiver end LSI 200, delays of each bit generated on the transmission path are different. Specifically, comparing with the chart in the top, the chart in the middle shows a case that the delay is smaller by half of the transmission clock than the delay in the top chart, and the chart in the bottom shows a case that the delay is larger by half of the transmission clock than the delay in the top chart.

As explained above, each the H-level signal, i.e. a gated stop signal, is sequentially stored in each of buffers constituting the clock-step ring buffer 243 from the buffer with the pointer value "8". As a result, the delayed gated stop signal for stopping the WT-PT-A is changed to the H-level signal when the pointer value output from the RD-PT-B becomes "8" (see the charts (24) and (25)).

Next, FIGS. 19A, 19B, and 19C are discussed. In FIGS. 19A, 19B, and 19C, the chart (26) represents the output data of the D-latch 112-1 (input data of the selector 125-1) of the transmitter end LSU 100. The chart (27) represents the contents of the stored data in each of the buffers constituting the data ring buffer.

It should be noted that in FIGS. 19A, 19B, and 19C, each of the charts (7), (9), (11), (25), and (27) has three charts. These three charts show, like in FIG. 13 and FIGS. 18A and 18B, a state that in the parallel data transmission from the transmitter end LSI 100 to the receiver end LSI 200, delays of each bit generated on the transmission path are different. Specifically, comparing with the chart in the top, the chart in the middle shows a case that the delay is smaller by half of the transmission clock than the delay in the top chart, and the chart in the bottom shows a case that the delay is larger by half of the transmission clock than the delay in the top chart.

In FIG. 19, the data "DT7" from which a broken line arrow is started is taken as an example. The data "DT7" is data that have been held in the D-latch 112-1 from when the gated stop signal (the chart (22)) changed to an H-level signal (see the chart (26)). Here because the D-latch 113-1 continues the operation regardless of the gated stop signal, the data "DT7" is transmitted to the receiver end LSI 200 (see the chart (4)).

It should be noted that, as shown in the chart (4), the D-latch 113-1 sequentially outputs the tuning patterns PTN0-PTN15 after the output of the data "DT7". This is because the D-latch 131 in FIG. 5 switches the selector 125-1 and activates the pattern generation circuit 123 after causing the gated stop signal to delay by one cycle. By means of such a configuration that the tuning pattern is sent out while the gated stop signal stops the clock, phase can be adjusted in the DLL 232-1 of the receiver end LSU 200, and consequently, failure in the subsequent data transmission at the time of resuming the clock can be prevented.

In the receiver end LSI, when the data "DT7" and the subsequent tuning pattern are received, the D-latch 212-1 successively latches the data "DT7" and the tuning pattern (see the charts (7) and (9)). However, the delayed gated stop signal explained in FIG. 18 becomes an H-level signal at timing shown in the chart (25), and the WT-PT-A stops the switching of the data write pointer after generating the pointer value "8" (see the chart (11)).

At a point in time when the D-latch 212-1 outputs the data "DT7", the WT-PT-A generates the pointer value "7", and therefore the data "DT7" is stored in a buffer with the pointer value "7" of the buffers constituting the data ring buffer (see the charts (9) and (11) and the chart (27)-[7]).

While the D-latch 212-1 outputs the tuning patterns PTN0-PTN15, the WT-PT-A continues to output the pointer value "8". As a result, each of the bit sequences of the tuning pattern is successively stored in buffers which constitute the data ring buffer and which have the pointer value "8" (see the charts (9) and (11) and the chart (27)-[8]). Accordingly, the bit sequences of the tuning pattern cannot delete the data "DT7" stored in the buffer with the pointer value "7" (see the chart (11) and the chart (27)-[7]).

By means of the control described above, among the transmission data that has been already sent out from the transmitter end LSI 100 to the receiver end LSI 200, all of the transmission data that is not latched in the D-latch 113-1 is to be stored in the data ring buffer at the time of gated stop signal issue. As a result, even if the clock-step execution function is used in the transmission system in FIG. 4, the transmission data from the LSI-A300 to the LSI-B400 cannot be lost.

A data receiver apparatus that is one aspect of the above described embodiments comprises a storage location indication unit for successively switching and indicating a storage location storing data transmitted from a transmitting source, and a delay unit for delaying a stop signal instructing to stop an operation, and the storage location indication unit stops switching the indication of the storage location when receiving the stop signal delayed by the delay unit.

According to the above configuration, the operation of the storage location indication unit is stopped after generation of the stop signal, and therefore data that have been transmitted from the transmitting source at the time of generation of the stop signal can be securely stored in the storage location. As a result, loss of the transmission data by the execution of the clock-step execution function can be prevented.

It should be noted that in the above-described data receiver apparatus according to the above described embodiments, delay time that the delay unit creates to delay the stop signal can be equivalent to a time period required from transmitting the data from the transmitting source to storing the data in the storage location.

According to the above configuration, the delay time for delaying the stop signal can be the shortest time period required to prevent transmission data loss.

The above-described data receiver apparatus according to the above described embodiments can further comprise a synchronous counter for performing a count operation in synchronization with a counter in the transmitting source for determining a timing to transmit a specific pattern data from the transmitting source, and can have a configuration in which the delay time is set based on a count value of the synchronous counter when storage of the specific pattern data transmitted from the transmitting source in the storage location is completed.

According to the above configuration, the delay time for delaying the stop signal can be the shortest time period required to prevent transmission data loss.

In the above-described data receiver apparatus according to the above described embodiments, the storage location indication unit switches the indication at a timing based on the clock transmitted from the transmitting source, and the delay unit synchronizes a timing of change of the delayed stop signal with the clock transmitted from the transmitting source.

In order to have such a configuration, the delay unit can be a ring buffer, for example.

According to the above configuration, it is possible to stop the storage location indication unit after securely storing the data transmitted from the transmitting source to a storage location even if an amount of delay varies in the data transmission from the transmitting source.

It should be noted that the configuration further comprises a read storage location indication unit for switching and indicating the storage location that is a reading source from which the data is read in the same order as the switching of indications by the storage location indication unit, and a synchronous counter for performing a count operation in synchronization with a counter in the transmitting source for performing a count operation in accordance with a timing to transmit the data from the transmitting source, and the read storage location indication unit may switch the indication at the timing of the count operation of the synchronous counter.

According to the above configuration, because operations of data transmission/reception are synchronized in the transmitter end and the receiver end, the transmission data can be securely received even if the amount of delay varies during the data transmission from the transmitter end.

The above-described data receiver apparatus according to the above described embodiments further comprises a phase adjustment unit for controlling an amount of delay when a clock synchronized with the data in the transmitting source and transmitted from the transmitting source is delayed based on the data so as to adjust a difference between a phase of the clock and a phase of the data, and the phase adjustment unit may adjust the phase difference based on specific pattern data transmitted from the transmitting source while the storage location indication unit stops the indication of switching of the storage location.

According to the above configuration, phase can be adjusted within a time period in which operation of the storage location indication unit stops, and therefore failure in the data transmission at the time of resuming the operation can be prevented.

The above-described data receiver apparatus according to the above described embodiments further comprises a test unit for reading bit sequence data of a specific pattern that is transmitted from the transmitting source and that is stored in the storage location, and for testing validity of the bit sequence data, and a length of the bit sequence data is at least twice as many as the number of types of indication by the storage location indication unit.

According to such a configuration, data storage and reading in any of the storage locations are performed plural times, and consequently, reliability of the test of the storage location can be improved.

At that time, a length of the bit sequence data is twice as many as the number of types of the indication by the storage location indication unit, and each of the bits in the second half of the bit sequence data is the inverse of each of the bits in the same position in the first half.

According to such a configuration, detection of a difference in cycles between storage and reading of the data in a storage location can be realized. In addition, storage and reading of two values of binary bit data can be tested in every storage locations.

At that time, the test unit may comprise a pattern data expected value generation unit for generating the bit sequence data delayed by a time expected to be required from transmitting the bit sequence data from the transmitting source to testing in the test unit, and a determination unit for determining whether the bit sequence data transmitted from the transmitting source matches with the specific pattern bit sequence data generated by the pattern data expected value unit.

According to the above configuration, validity of the bit sequence data transmitted from the transmitting source can be tested.

At that time, the pattern data expected value generation unit may comprise a synchronous counter for performing a count operation in synchronization with a counter in the transmitting source for determining a timing to transmit a specific pattern data from the transmitting source.

According to the above configuration, the synchronous counter can be used to delay the generated bit sequence data by the above estimated time.

The data transmitter apparatus that is another aspect of the above described embodiments comprises a stop unit for stopping an output of data to be transmitted to a data transmission path when receiving a stop signal instructing to stop an operation, and a switching unit for outputting specific pattern data instead of the data to be transmitted to the data transmission path when receiving the stop signal.

According to the configuration, tests and adjustments of the transmission path using specific pattern data can be realized in receiving locations of the data to be transmitted while the output of the data to be transmitted is stopped. As a result, failure in the data transmission at the time of resuming operations can be prevented.

The present invention is not limited to the above described embodiments; however, various changes or modifications can be made without departing from the scope of the gist of the present invention.

What is claimed is:

1. A data receiver apparatus comprising:
   a storage location indication unit that successively switches and indicates a storage location storing data transmitted from a transmitting source; and
   a delay unit that delays a stop signal instructing to stop an operation, wherein
   the storage location indication unit stops switching the indication of the storage location when receiving the stop signal delayed by the delay unit, and
   a delay time that the delay unit creates to delay the stop signal is equivalent to a time period required from transmitting the data from the transmitting source to storing the data in the storage location.

2. A data receiver apparatus comprising:
   a storage location indication unit that successively switches and indicates a storage location storing data transmitted from a transmitting source;
   a delay unit that delays a stop signal instructing to stop an operation; and
   a synchronous counter that performs a count operation in synchronization with a counter in the transmitting source to determine a timing to transmit a specific pattern data from the transmitting source, wherein
   the storage location indication unit stops switching the indication of the storage location when receiving the stop signal delayed by the delay unit, and
   the delay time is set based on a count value of the synchronous counter when storage of the specific pattern data transmitted from the transmitting source in the storage location is completed.

3. A data receiver apparatus comprising:
   a storage location indication unit that successively switches and indicates a storage location storing data transmitted from a transmitting source; and
   a delay unit that delays a stop signal instructing to stop an operation, wherein
   the storage location indication unit stops switching the indication of the storage location when receiving the stop signal delayed by the delay unit,
   the storage location indication unit switches the indication at a timing based on a clock transmitted from the transmitting source, and
   the delay unit synchronizes a timing of change of the delayed stop signal with the clock transmitted from the transmitting source.

4. The data receiver apparatus according to claim 3, wherein the delay unit is a ring buffer.

5. The data receiver apparatus according to claim 3, further comprising:
   a read storage location indication unit that switches and indicates the storage location that is a reading source from which the data is read in the same order as the switching of indications by the storage location indication unit; and
   a synchronous counter that performs a count operation in synchronization with a counter in the transmitting source to perform a count operation in accordance with a timing to transmit the data from the transmitting source, wherein
   the read storage location indication unit switches the indication at the timing of the count operation of the synchronous counter.

6. A data receiver apparatus comprising:
   a storage location indication unit that successively switches and indicates a storage location storing data transmitted from a transmitting source;
   a delay unit that delays a stop signal instructing to stop an operation; and
   a phase adjustment unit that controls an amount of delay when a clock synchronized with the data in the transmitting source and transmitted from the transmitting source is delayed based on the data so as to adjust a difference between a phase of the clock and a phase of the data, and wherein
   the storage location indication unit stops switching the indication of the storage location when receiving the stop signal delayed by the delay unit, and
   the phase adjustment unit adjusts the phase difference based on specific pattern data transmitted from the transmitting source while the storage location indication unit stops the indication of switching of the storage location.

7. A data receiver apparatus comprising:
   a storage location indication unit that successively switches and indicates a storage location storing data transmitted from a transmitting source;
   a delay unit that delays a stop signal instructing to stop an operation; and
   a test unit that reads bit sequence data of a specific pattern transmitted from the transmitting source and stored in the storage location, and that tests validity of the bit sequence data, wherein
   the storage location indication unit stops switching the indication of the storage location when receiving the stop signal delayed by the delay unit, and
   a length of the bit sequence data is at least twice as many as a number of types of indication by the storage location indication unit.

8. The data receiver apparatus according to claim 7, wherein
   the length of the bit sequence data is twice as many as the number of types of the indication by the storage location indication unit, and each of bits in a first half of the bit sequence data relates to each of bit in a last half in a manner that each value is inverted.

9. The data receiver apparatus according to claim 7, wherein the test unit comprises:
- a pattern data expected value generation unit that generates the bit sequence data delayed by a time expected to be required from transmitting the bit sequence data from the transmitting source to testing in the test unit; and
- a determination unit that determines whether the bit sequence data transmitted from the transmitting source matches with the specific pattern bit sequence data generated by the pattern data expected value unit.

10. The data receiver apparatus according to claim 9, wherein the pattern data expected value generation unit comprises a synchronous counter that performs a count operation in synchronization with a counter in the transmitting source to determine a timing to transmit a specific pattern data from the transmitting source.

11. A data receiving method comprising:

delaying a stop signal instructing to stop an operation; and stopping an instruction to successively switch a storage location to store data transmitted from a transmitting source when receiving the delayed stop signal, wherein a delay time for delaying the stop signal is equivalent to a time period required from transmitting the data from the transmitting source to storing the data in the storage location.

12. A data receiving method comprising:

delaying a stop signal instructing to stop an operation;

stopping an instruction to successively switch a storage location to store data transmitted from a transmitting source when receiving the delayed stop signal; and controlling an amount of delay when a clock synchronized with the data in the transmitting source and transmitted from the transmitting source is delayed based on specific pattern data transmitted from the transmitting source while switching of the storage location is stopped, so as to adjust a phase difference between the clock and the data.

* * * * *